United States Patent
Bhunia et al.

(10) Patent No.: US 11,657,127 B2
(45) Date of Patent: May 23, 2023

(54) HARDWARE INTELLECTUAL PROPERTY PROTECTION THROUGH PROVABLY SECURE STATE-SPACE OBFUSCATION

(71) Applicant: University of Florida Research Foundation, Inc., Gainesville, FL (US)

(72) Inventors: Swarup Bhunia, Gainesville, FL (US); Md Moshiur Rahman, Gainesville, FL (US); Abdulrahman Alaql, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 233 days.

(21) Appl. No.: 17/120,778

(22) Filed: Dec. 14, 2020

(65) Prior Publication Data

US 2021/0192018 A1    Jun. 24, 2021

Related U.S. Application Data

(60) Provisional application No. 62/951,494, filed on Dec. 20, 2019.

(51) Int. Cl.
| | |
|---|---|
| *G06F 21/14* | (2013.01) |
| *G06F 9/448* | (2018.01) |
| *G06F 30/327* | (2020.01) |
| *G06F 21/60* | (2013.01) |
| *G06F 21/75* | (2013.01) |

(52) U.S. Cl.
CPC ............ *G06F 21/14* (2013.01); *G06F 9/4498* (2018.02); *G06F 21/602* (2013.01); *G06F 21/75* (2013.01); *G06F 30/327* (2020.01)

(58) Field of Classification Search
CPC ........ G06F 21/14; G06F 21/602; G06F 21/75; G06F 9/4498; G06F 30/327
USPC ......................................................... 713/189
See application file for complete search history.

(56) References Cited

U.S. PATENT DOCUMENTS

| | | | |
|---|---|---|---|
| 2006/0036872 A1* | 2/2006 | Yen ..................... | G06F 21/79 713/183 |
| 2007/0189532 A1* | 8/2007 | Onozu ................. | G06Q 20/341 380/247 |
| 2011/0016326 A1* | 1/2011 | Craig ..................... | G06F 21/31 713/185 |

OTHER PUBLICATIONS

Chakraborty et al., "HARPOON: an Obfuscation-Based SoC Design Methodology for Hardware Protection". IEEE Transactions on Computer-Aided Design of Integrated Circuits and Systems. vol. 28, No. 10, pp. 1493-1502, Oct. 2009.

(Continued)

*Primary Examiner* — Michael S McNally
(74) *Attorney, Agent, or Firm* — Thomas | Horstemeyer, LLP

(57) ABSTRACT

The present disclosure describes exemplary methods and systems of protecting an integrated circuit. One exemplary method comprises receiving a plurality of key inputs for enabling operation of the integrated circuit; determining whether the received key inputs are correct key inputs for enabling operation of the integrated circuit; and if the received key inputs are determined to be incorrect key inputs, locking sequential logic and combinational logic of the integrated circuit until correct key inputs are received.

18 Claims, 32 Drawing Sheets

(56) References Cited

OTHER PUBLICATIONS

Chakraborty et al. "Protection of Intellectual Property Cores Through a Design Flow" U.S. Pat. No. 8,402,401, issued Mar. 18, 2013.
Rajendran et al. "System, Method and Computer-Accessible Medium for Facilitating Logic Encryption" U.S. Pat. No. 9,817,980, Issued Nov. 14, 2017.

* cited by examiner

Algorithm 1 State Space Obfuscation

Input : Gate-level netlist(original design), Gate-level netlist(NLFSR), Constraints
Output : Obfuscated gate-level netlist
1: function Main($Netlist_{org}$, $Netlist_{nlfsr}$, $Constraints$)
2:   $G_{org}$ = CreateGraphFromVerilog($Netlist_{org}$)
3:   $ListOf\ StateFF$ = IdentifyStateFlops($G_{org}$)
4:   $ListOf\ PstateFF$ = IdentifyPseudoStateFlops($G_{org}$, $ListOf\ StateFF$)
5:   $ListOf\ FF$ = $ListOf\ StateFF$ + $ListOf\ PstateFF$
6:   GenerateOfsmDfsm($Constraints$)
7:   $G_{nlfsr}$ = CreateGraphFromVerilog($Netlist_{nlfsr}$)
8:   $G_{hira}$ = MergeNlfsr($G_{org}$, $G_{nlfsr}$, $ListOf\ FF$)
9:   $G_{obf1}$ = MergeOfsm($G_{hira}$)
10:   $G_{obf2}$ = InsertModCell($G_{obf1}$, $Constraints$)
11:   $G_{obf}$ = MergeDfsm($G_{obf2}$)
12:   $Netlist_{merged}$ = ConvertGraph2verilog($G_{obf}$)
13:   $Netlist_{obf}$ = DoSynthesis($Netlist_{merged}$)
14:   return $Netlist_{obf}$
15: end function
16: function CreateGraphFromVerilog($Netlist$)
17:   $Graph$ = create edges (from nets) and vertices (from gates)
18:   return $Graph$
19: end function
20: function IdentifyStateFlops($Graph$)
21:   for each flip-flop in $Graph$ do
22:     find feedback path from output to input
23:     if found a path then
24:       add the flip-flop to list of state flip-flops
25:     end if
26:   end for
27:   return list of state flip-flops
28: end function
29: function IdentifyPseudoStateFlops($Graph$, $StateFFs$)
30:   for each state flip-flop in $StateFFs$ do
31:     find data path flip-flop(s) in fan-in cone
32:     if found flip-flop(s) then
33:       add the flip-flop(s) to list of pseudo state flip-flops
34:     end if
35:   end for
36:   return list of pseudo state flip-flops
37: end function

FIG. 1B

Algorithm 1 Continued...

38: function GenerateOfsmDfsm(*Constraints*)
39:     write RTL of OFSM and DFSM
40:     return *RTL*
41: end function
42: function MergeNlfsr(*Graph$_{org}$, Graph$_{nlfsr}$, ListOf FF*)
43:     for each element of *ListOf FF* do
44:         insert a 2 input mux at FF input
45:         add original logic cone in 1 input of mux
46:         add NLFSR logic cone in another input of mux
47:     end for
48:     return *Graph$_{org}$*
49: end function
50: function MergeOfsm(*Graph*)
51:     for each added mux in *Graph* do
52:         stitch select input of mux with enable signal from OFSM
53:         replace each input to the OFSM with primary input of the design
54:     end for
55:     return *Graph*
56: end function
57: function InsertModCell(*Graph, Constraints*)
58:     while *Constraints* not satisfied do
59:         insert a key gate in combinational logic
60:         add original logic cone in 1 input of the key gate
61:     end while
62:     return *Graph*
63: end function
64: function MergeDfsm(*Graph*)
65:     for each added key gate in *Graph* do
66:         stitch other input of key gate with enable signal from DFSM
67:         replace each input to the DFSM with primary input of the design
68:     end for
69:     return *Graph*
70: end function
71: function ConvertGraph2Verilog(*Graph*)
72:     *Netlist* = write verilog design from *Graph*
73:     return *Netlist*
74: end function
75: function DoSynthesis(*HDL*)
76:     *Netlist* = synthesize the *HDL*
77:     return *Netlist*
78: end function

FIG. 1C

— Feed-back path
⟋ Feed-forward path

Operation

| Input (In) | Input to FSM (X) | Current State ($S_c$) | Next State ($S_n$) | Output (Out) | Expected Output |
|---|---|---|---|---|---|
| 10 | 00 | 000(S0) | 001(S0) | 000 | 000 |
| 01 | 10 | 001(S0) | 010(S4) | 000 | 100 |
| 01 | 01 | 001(S4) | 100(S3) | 100 | 011 |

Same set of Random Inputs

State traversal: S0 → S0 → S4 → S3 → ...
Expected state traversal: S0 → S4 → S3 → S1 → ...

Change in output due to different state traversal

Legend
SFF → State Flip-Flop
DPF → Date Path Flip-flop
Current State, $S_c$ = {$Q_{SFF2}$, $Q_{SFF1}$, $Q_{SFF0}$}
$S_0$ → Initial State
Next State, $S_n$ = {$D_{SFF2}$, $D_{SFF1}$, $D_{SFF0}$}
Input, In = {In1, In0}
Input to FSM, X = {X1, X0}
Output, Out = {Out2, Out1, Out0}

FIG. 3E

Original Design
12 state flip-flops

Reachable states = 42

Obfuscated Design
18 state flip-flops (6 added)

Reachable states = 183500

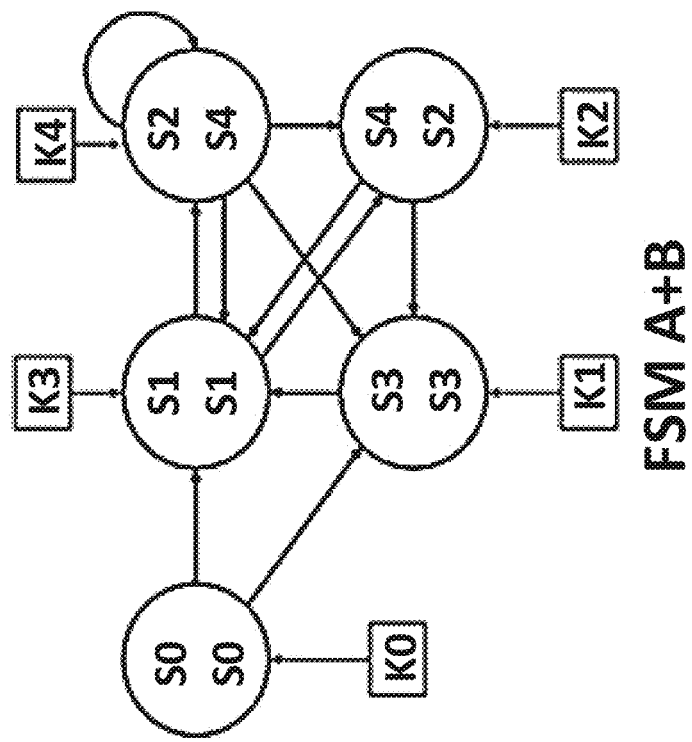
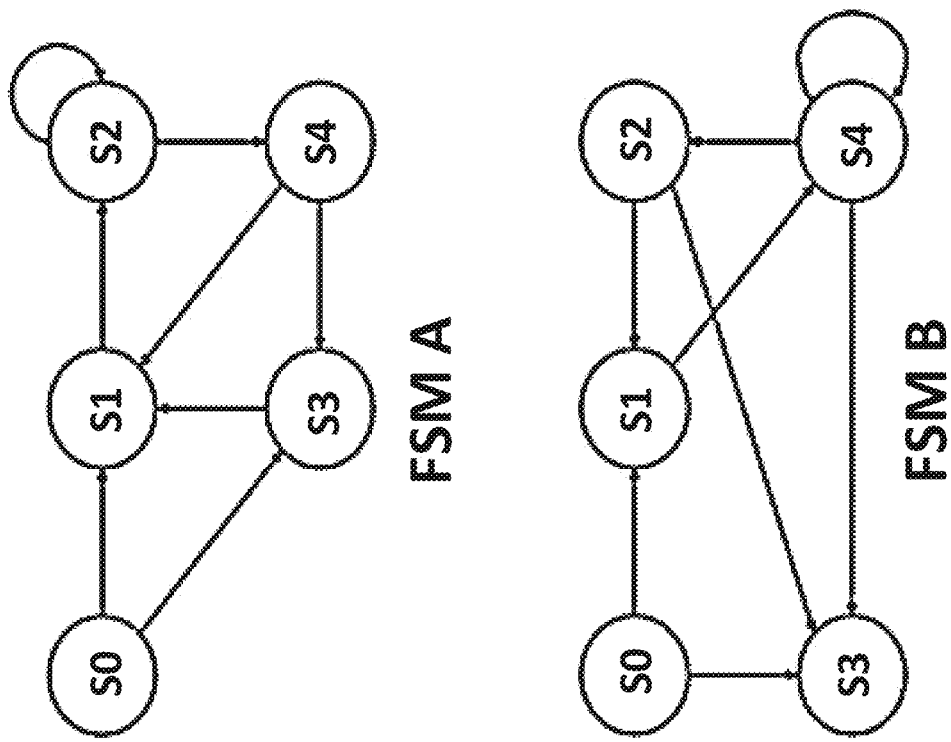
FIG. 24

Algorithm 2 FSM Steganography
1: procedure FSM Merging
2: Input: *GraphA*: State Transition Graph for FSM A
3: Input: *GraphB*: State Transition Graph for FSM B
4: *GraphM* : Create an Empty Graph
5: *KeyA* = {}
6: *KeyB* = {}
7: $A_{paths}[i]$: Break *GraphA* into non-touching paths 8: $B_{paths}[j]$: Break *GraphB* into non-touching paths 9: Sort $A_{paths}[i]$ By highest to lowest path length
10: Sort $B_{paths}[j]$ By highest to lowest path length
11: for *p1* in $A_{paths}[i]$
12:    for *p2* in $B_{paths}[j]$
13:       if length(*p1*) == length(*p2*) then
14:          Generate Random Key Bits $K_a$ and $K_b$
15:          Update *p1* States to be enabled by $K_a$
16:          Update *p2* States to be enabled by $K_b$
17:          $p_m$: Merge states in *p1* and *p2*
18:          *GraphM* ← $p_m$
19:          *KeyA* ← $K_a$
20:          *KeyB*  $K_b$
21:          Exit Loop;
22:       end if
23: end for
24: end for
25: Add non-mapped states to *GraphM*
26: Output: *GraphM* : Mixed State Transition Graph for FSM A+B
27: Output: *KeyA*: Secret Key to Enable FSM A   28: Output: *KeyB*: Secret Key to Enable FSM B   29: end procedure

FIG. 25

HARDWARE INTELLECTUAL PROPERTY PROTECTION THROUGH PROVABLY SECURE STATE-SPACE OBFUSCATION

CROSS-REFERENCE TO RELATED APPLICATION

This application claims priority to U.S. provisional application entitled, "Hardware Intellectual Property Protection Through Provably Secure State-Space Obfuscation," having Ser. No. 62/951,494, filed Dec. 20, 2019, which is entirely incorporated herein by reference.

STATEMENT REGARDING FEDERALLY SPONSORED RESEARCH OR DEVELOPMENT

This invention was made with government support under FA8650-18-1-7821 awarded by US Department of Defense DARPA. The government has certain rights in the invention.

BACKGROUND

Most of the vulnerabilities associated with hardware intellectual property (IP) is a concern due to the IC (integrated circuit) supply chain shifting from a vertical model to a horizontal model to mitigate the effects of increasing cost and longer time-to-market problems. Due to the horizontal model of the IC supply chain, the SoC (system on chip) design houses get hardware IPs from several vendors, and the design house may need to have white-box access or a gate-level netlist of the hardware IPs. Ideally, the hardware IP vendors should make sure that the design house poses no threat to such accessibility of IPs. Unfortunately, hardware IPs contain undetected and serious security flaws that are inherent to the current state-of-the-art behavioral design. Almost all real hardware IPs have control logic embedded into the hardware which guides the operation of the circuit, and a common form of the control logic is a finite state machine (FSM). In the gate-level design, an FSM is a group of registers or flip-flops (FFs), referred to as state flip-flops, that control the operation of a circuit by traversing through a number of states where the number of flip-flops in the state machine defines the number of states or a state-space of that FSM. In the real circuit design scenarios, the size of the FSM is quite small, and the ratio of the state-space being used to the available state-space, or in another term, the reachability is quite low. These deficiencies make the FSMs vulnerable to reverse engineering. An adversarial entity can take advantage of this small size and easily reverse engineer the smaller state-space of the FSM to get access to the control logic part of the IP with minimal effort. Such unauthorized access may lead to cloning, Trojan insertion, degradation in performance of the IP, loss of revenue, etc.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1B-1C shown an exemplary algorithm (Algorithm 1) for a state-space obfuscation methodology in accordance with embodiments of the present disclosure.

FIG. 3E illustrates state traversals for operation of a pipe-lined FSM for random input stimuli in accordance with various embodiments of the present disclosure.

FIG. 24 illustrates an exemplary FSM steganography method, where an original FSM and a dummy FSM are merged and locked using a key-controlled locking mechanism, in accordance with various embodiments of the present disclosure.

FIG. 25 illustrates an exemplary merging process (Algorithm 2) in accordance with FIG. 24.

DETAILED DESCRIPTION

Figure 1A:
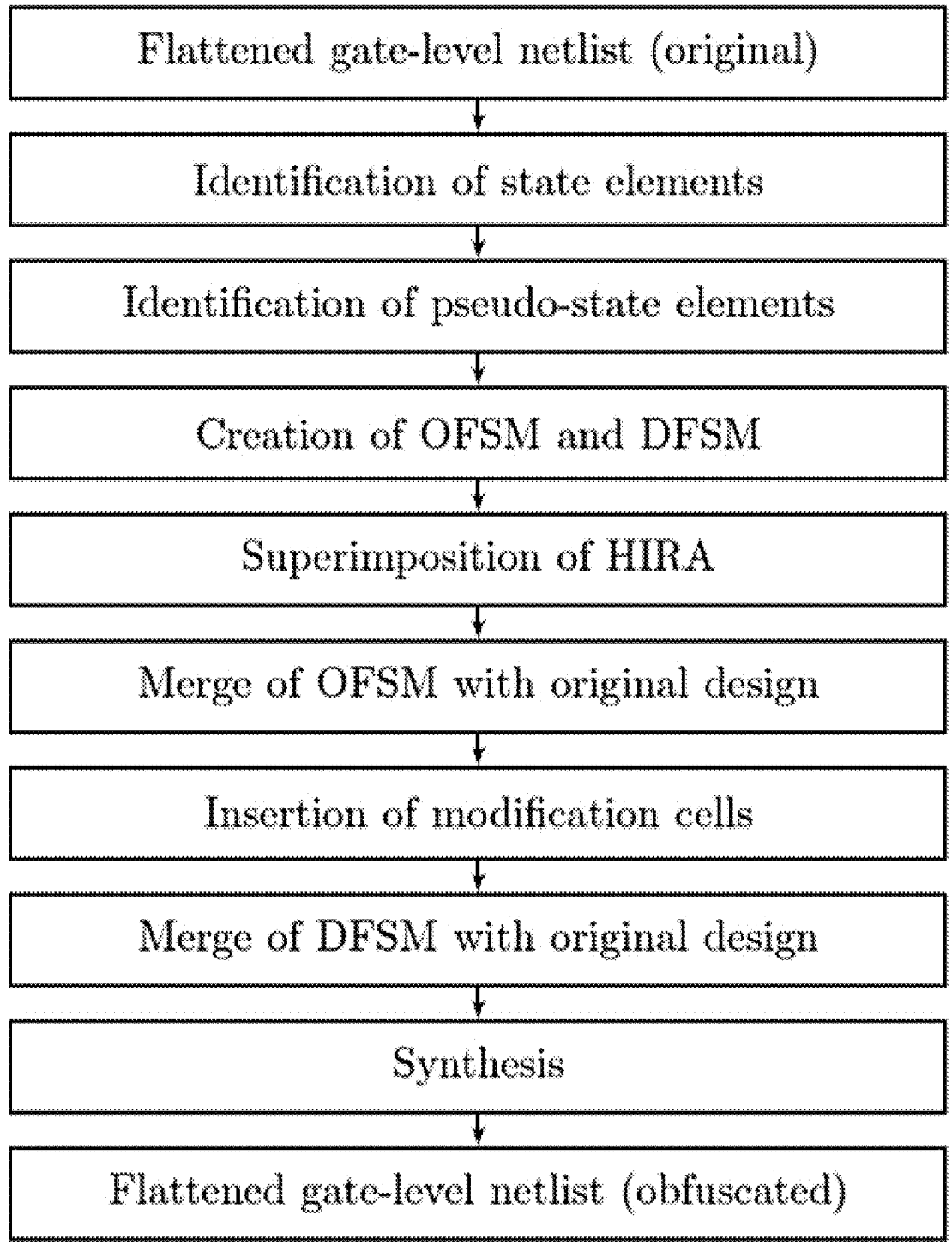
FIG. 1A is a flow chart illustrating steps of an exemplary state-space obfuscation technique in accordance with various embodiments of the present disclosure.

The present disclosure describes various embodiments of systems, apparatuses, and methods for novel sequential obfuscation techniques that address common vulnerabilities inherent to the existing obfuscation methods. Such an exemplary sequential obfuscation technique obfuscates the control logic part as well as the combinational logic of a gate-level intellectual property (IP) core, which is proven to be resistant to all known attacks. The present disclosure further introduces an automated obfuscation tool (referred to as ProtectIP) which is capable of obfuscating large-scale commercial hardware IPs using state-space obfuscation, in accordance with various embodiments of the present disclosure.

System-on-chip (SoC) design using reusable hardware intellectual property (IP) is a common practice in the industry. The IP cores can have different forms such as synthesizable register transfer level (RTL) descriptions ("Soft IP"), a gate-level netlist of a direct hardware implementation ("Firm IP"), or GDS-II design database ("Hard IP"). Integration of these tested, verified, and reusable IP modules to design a complex system incurs significantly lower cost and time-to-market. In the process of this integration, the IPs are vulnerable to IP-piracy and reverse engineering. In the current model of the semiconductor supply chain, several entities can get access to the hardware IP and the following situations may arise:

(1) An SoC integrator buys IP cores from IP vendors and makes illegal copies of the same IP to sell it to another design house claiming the IP ownership. This may involve modification of the IP by inserting Trojan or watermarks;

(2) An untrusted fabrication house makes duplicate copies of the GDS-II design file received from chip design house and sells illegal copies;

(3) An untrusted foundry manufactures and sells cloned or counterfeit integrated circuits (IC) under a different entity name; and/or (4) An adversary reverse engineers the IP of any form to make the clone of the IP.

The above situations implicate that all the parties involved in the IC design and manufacturing flow pose threats in different forms of IP infringement. Hence, there is a critical need to provide protection of hardware IPs throughout the design flow by keeping the flow transparent to all parties involved.

Hardware obfuscation is a design transformation mechanism that prevents unauthorized entities from getting access to the hardware IPs by locking the functionality and hiding the design intent. Hardware obfuscation has been of promising interest through the last two decades in the hardware security research field. A good amount of efforts has been made to investigate and come up with a feasible and secure methodology of obfuscation. To address the issues inherent to the IC supply chain, a number of obfuscation techniques have been previously proposed, e.g., logic locking, hardware metering, camouflaging, split manufacturing, HARPOON, etc. Unfortunately, existing obfuscation approaches are not resistant to a variety of functional and structural attacks. Due to the inability to analyze a technique from the attacker's standpoint, numerous vulnerabilities inherent to the obfuscation techniques go undetected unless a true adversary discovers them. The solution provided by exemplary embodiments of the present disclosure has been verified by a team of researchers who acted as an adversary to break the locking mechanism. To the best of the inventors' knowledge, no other techniques have gone through this level of scrutiny to make sure that a described solution, in accordance with the present disclosure, is robust against all known attacks.

In modern SoCs, almost all critical IPs have embedded control logic which guides the operation of the IPs, and a common form of the control logic is a finite state machine (FSM). In the gate-level design, an FSM is a group of registers or flip-flops (FFs), referred to as state flip-flops, that controls the operation of a circuit by traversing through a number of states, where the number of flip-flops in the state machine defines the number of states or the state-space of that FSM. In the real circuit design scenarios, the size of the FSM is quite small, and the ratio of the state-space being used to the available state-space or reachability is quite low. These deficiencies make the FSMs vulnerable to reverse engineering. An adversarial entity can take advantage of this small size and easily reverse engineer the smaller state-space of the FSM to get access to the control logic part of the IP with minimal effort. Such unauthorized access may lead to cloning, Trojan insertion, degradation in performance of the IP, loss of revenue, etc. In order to protect the IPs from being affected in above mentioned scenarios, hardware obfuscation is a comprehensive and an effective solution. In general, hardware obfuscation is a methodology that locks the functionality of the design and introduces non-functional behavior into the design. Upon provisioning lock specific keys, correct functional behavior can be accessed from the design meaning that the design can be unlocked and used for its intended purpose.

In order to transform the state machine and expand the state-space, it is required to know the transfer function or state transition diagram of the FSM. Such transition function identification starts with identifying the FSM from an IP. However, with increasing complexity of commercial IPs, it is difficult to locate and extract the FSM and enumerate the entire state-space even for a small design. State-of-the-art commercial IPs are quite more complex and large. To deal with such exponentially complexity of the logic of the IP, scalable FSM obfuscation needs to be applied that serves the purpose of obfuscation without requiring the enumeration. Hence, various embodiments of the present disclosure present a set of robust algorithms to apply state-space obfuscation that does not require identification of explicit FSM and enumeration of the state-space. Alternatively, in some embodiments, specific structures of flip-flops from a synthesized gate-level netlist of an IP are considered and the input logic is modified in a way that enhances the state-space reachability and brings in structural changes to the logic. Once identification of the flip-flops is completed, the flip-flops can be obfuscated by adding extra sequential and combinational logic. Major algorithms behind the obfuscation methodologies include but are not limited to identification of flip-flops from a gate-level netlist which constitutes the FSM; functional obfuscation by state-space expansion by modifying the input logic of the existing flip-flops in the design and/or by adding extra flip-flops to the design; and structural obfuscation by inserting combinational cells in the design.

An exemplary obfuscation methodology, in accordance with embodiments of the present disclosure, helps to protect a hardware intellectual property (IP) from reverse-engineering (RE), piracy, and malicious modifications by locking the design at the finite state machine (FSM) level of abstraction before being transferred to an offshore untrusted foundry or design facility for fabrication. Unlike existing logic locking approaches, which aim at locking circuits by inserting key gates at strategic places of a combinational logic block, an exemplary approach, in accordance with embodiments of the present disclosure, transforms and locks the embedded finite state machine of a design. An exemplary state-space obfuscation approach for gate-level IP blocks, in accordance with embodiments of the present disclosure, is scalable and can quantify the level of security of the obfuscated design. In various embodiments, an exemplary methodology can apply to any sequential design and lock the design by performing both sequential and combinational locking. A flow chart for a complete and exemplary obfuscation approach is shown in FIG. 1A. The steps recited in FIG. 1A include providing a flattened gate-level netlist, identification of state elements within the flattened gate-level netlist for an original design of hardware IP, identification of pseudo-state elements within the flattened gate-level netlist, creation of an Obfuscation FSM (OFSM) and a Data-path enable FSM (DFSM), superimposition of an HIRA (Highly Reachable Automata), merging of OFSM with the original design, insertion of modification cells in the design, synthesis of an obfuscated netlist for the hardware IP, and then further processing the netlist to generate a new flattened gate-level netlist that is obfuscated for the hardware IP. Algorithm 1 (FIGS. 1B-1C) reflects the steps associated with the implementation, which are discussed in the following pages.

Figure 2A:
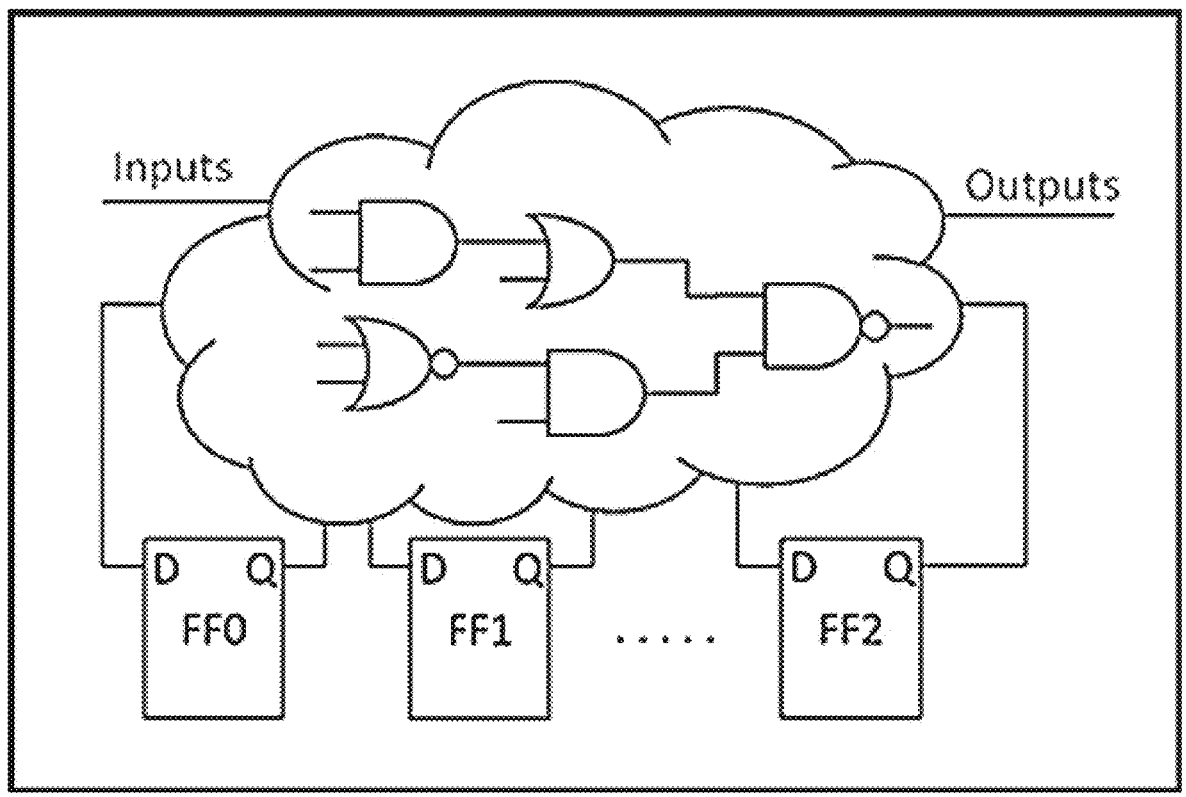
FIG. 2A illustrates an exemplary high-level diagram of a finite state machine (FSM) as often used in sequential designs in accordance with the present disclosure.

An exemplary obfuscation approach in accordance with embodiments of the present disclosure applies to the gate-level abstraction of the hardware description language and to the design, which has sequential logic in it. Before insertion of the locking circuitries, the design is flattened to remove any hierarchy. A next step for obfuscating the design sequentially is to identify the state flip-flops, which constitute the FSMs. The modification of data path flip-flops is omitted unless any control path or state flip-flop is unable to be found. In general, FSMs are sources of state elements that generate the control logic to guide the operation of a circuit. FSM is a group of flip-flops (FFs) that holds the state value of the design, and based on the current state value and available input(s), the next state value is determined. A high-level diagram of an exemplary state machine is shown in FIG. 2A. The commonly accepted criteria of a flip-flop to be a state flip-flop is that it will have a feedback path that comes out from the output port of the flip-flop and enters the input port of the same flip-flop through some combinational logic or a combination of sequential and combinational logic. This feedback path differentiates between the state flip-flops and data path flip-flops, which have no feedback path. As shown in FIG. 2A, all three flip-flops (FF0, FF1, FF2) are state flip-flops.

Hence, it is crucial to classify the flip-flops based on their contribution to different logic blocks as a pre-processing step of obfuscation. The flip-flops in a gate-level netlist can be divided into three classes: (1) state flip-flops; (2) pseudo state flip-flops; and (3) data-path flip-flops.

Figure 2B:
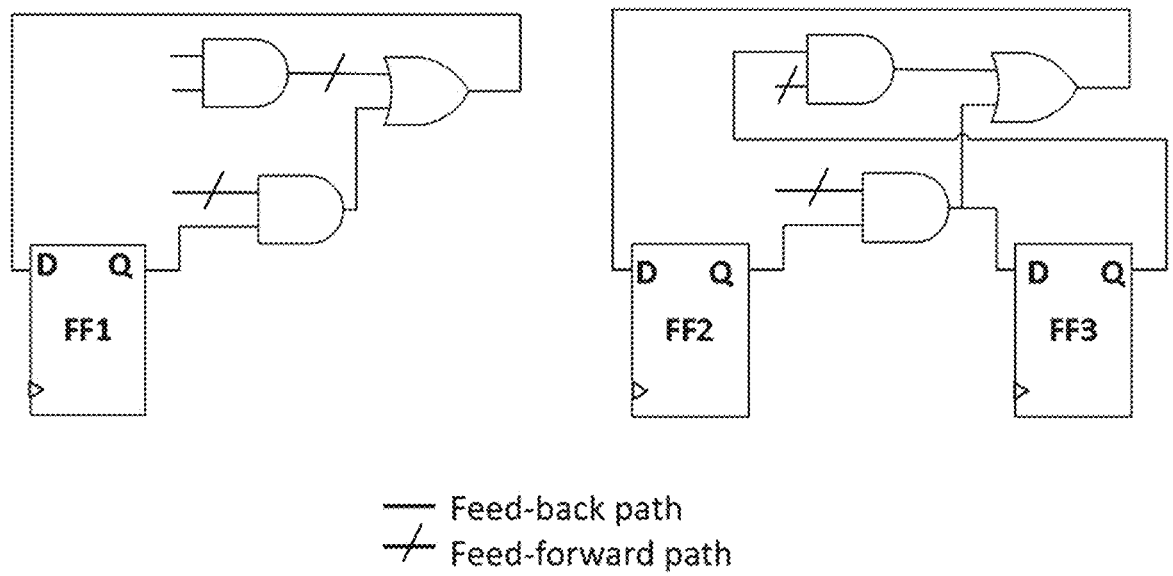
FIG. 2B shows a structure of state flip-flops with a feedback loop in a gate-level netlist in accordance with the present disclosure.
Figure 2C:
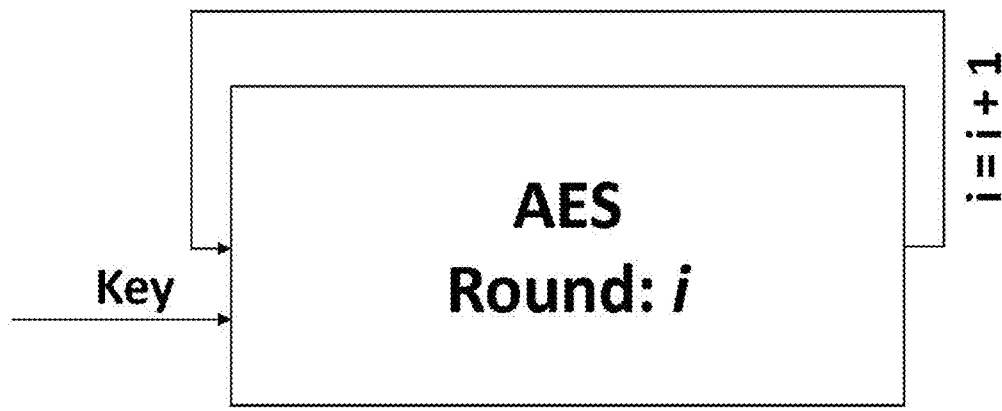
FIG. 2C shows a feedback loop in an AES encryption operation in accordance with the present disclosure.

A typical FSM will be synthesized using a group of flip-flops and associated combinational logic gates. Due to the behavioral operation, the next state of the FSM depends on the current state and input stimuli. As a result, synthesized FSM netlist will create a specific structure around the flip-flop. A common structure of a flip-flop in an FSM is to have a feedback path of combinational logic from the output of the flip-flop (current state) to its input (next state). The feedback logic may contain a set of logical inputs (input stimuli) as shown in FIG. 2B. Accordingly, the figure shows a structure of state flip-flops (FF1, FF2, and FF3) with a feedback loop in a gate-level netlist, in which FF1 & FF2 have direct feedback (from the output to the input of same flip-flop through combinational logic) and FF3 has a secondary feedback path (through another flip-flop). Such structural configuration of a flip-flop defines it to be classified as a state flip-flop. In state-space obfuscation, a power-up or obfuscated mode of operation brings these state flip-flops to an unreachable or non-functional state. In order to bring the flip-flops to a functional or normal mode of operation, the state flip-flops should be initialized to their original power-up states once the obfuscated design switches from a locked mode to an unlocked mode. For this reason, proper identification of state flip-flops is a prerequisite for state-space obfuscation. Although, a flip-flop with combinational logic in a feedback loop is considered to be a state flip-flop, not all state flip-flops that are identified will be part of an explicit FSM, in accordance with various embodiments of the present disclosure. A flip-flop which is part of data-path and somehow falls in a logic path loop will also be considered as a state flip-flop. For example, in AES (Advanced Encryption Standard) cryptographic operation, an output from one round is used as an input to the next round where each round consists of a pure data-path operation. If an optimized design is being used to implement AES, it is most likely that all the flip-flops in the data-path of one round will be part of the feedback loop, as shown in FIG. 2C. In this way, the definition of a state flip-flop in an exemplary state-space obfuscation algorithm is not so conservative to extract the FSM from a gate-level netlist.

Figure 2D:
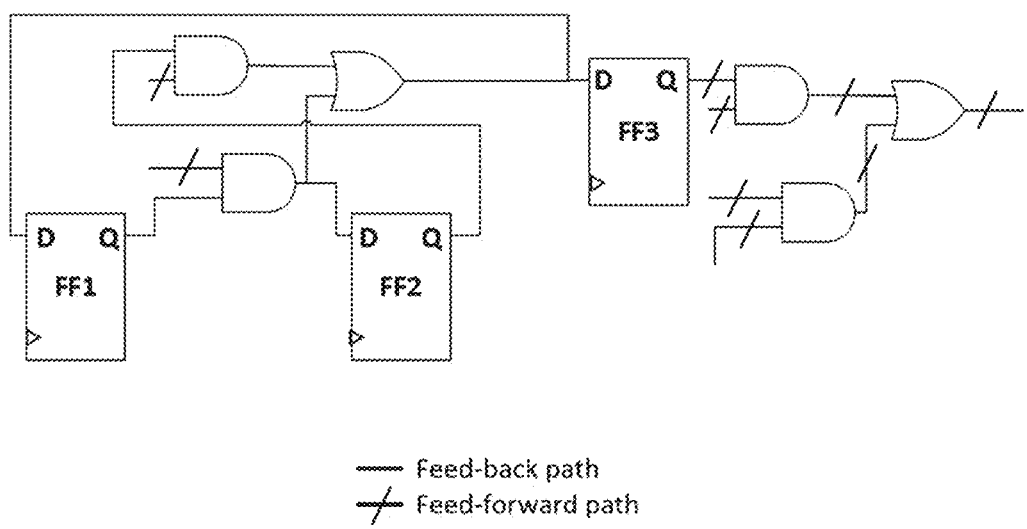
FIG. 2D shows a structure of data-path flip-flops in a gate-level netlist in accordance with the present disclosure.

Almost all commercial hardware IPs contain some sort of pipe-lined logic in order to improve the performance or leverage the architectural resources in an SoC. Pipe-lined logic is almost always clock enabled which results in a flip-flop being controlled by a clock input with combinational logic at the input port. These pipeline flip-flops are referred to as data-path flip-flops which do not contain any feedback path from the output port of the flip-flop to its input port as compared to state flip-flops. The gate-level netlist structure of a sample data-path flip-flop (that has no feedback path from the output to the input of the flip-flop) is shown in FIG. 2D. Here, FF3 is properly classified as a data-path flip-flop and not a state flip-flop. In short, any flip-flop in a netlist which is not a state flip-flop can be labeled as a data-path flip-flop. As these flip-flops are not likely to impact the operation of the FSM, it is not required to initialize the data-path flip-flops to their power-up states once the obfuscated design switches from locked states to functional states.

Due to the pipelined structure of a hardware IC design, a series of flip-flops may need to be placed in the data-path of the design. For example, data-path flip-flops are often inserted into the design to meet performance constraints. Among such data-path flip-flops, a group of flip-flops may be placed in the fan-in logic of the state machine, and act as pseudo-state flip-flops. The term pseudo refers to the fact that the flip-flops are not part of the state machine but have an impact on the state transition of the FSM. The reason for labelling these flip-flops as pseudo-state flip-flops can be explained using the example of a sample FSM with pipelined logic and without pipe-lined logic at the inputs. FIGS. 3A-3E shows the impact of data-path flip-flops on the state transition of an FSM.

Figure 3A:
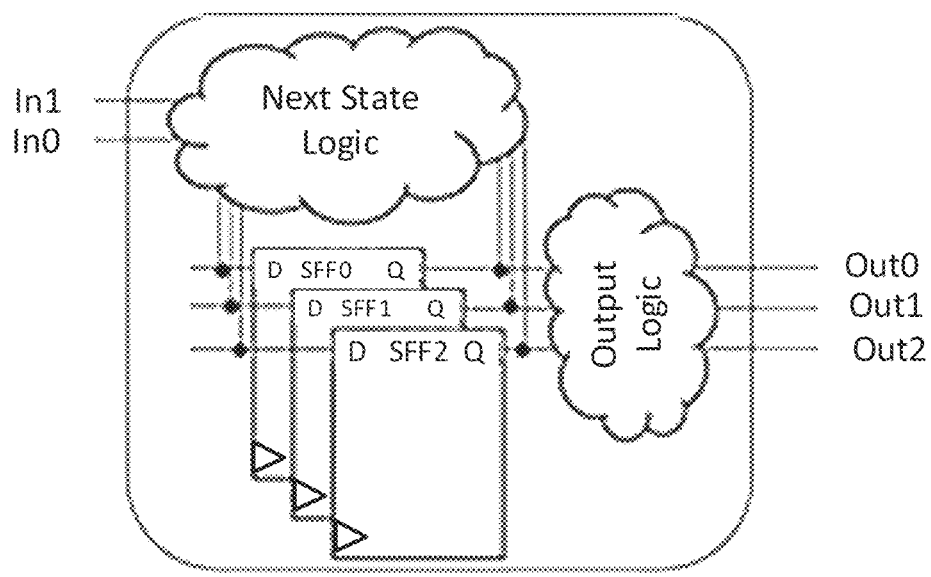
FIG. 3A illustrates an exemplary design containing an FSM without a pipeline in accordance with the present disclosure.
Figure 3B:
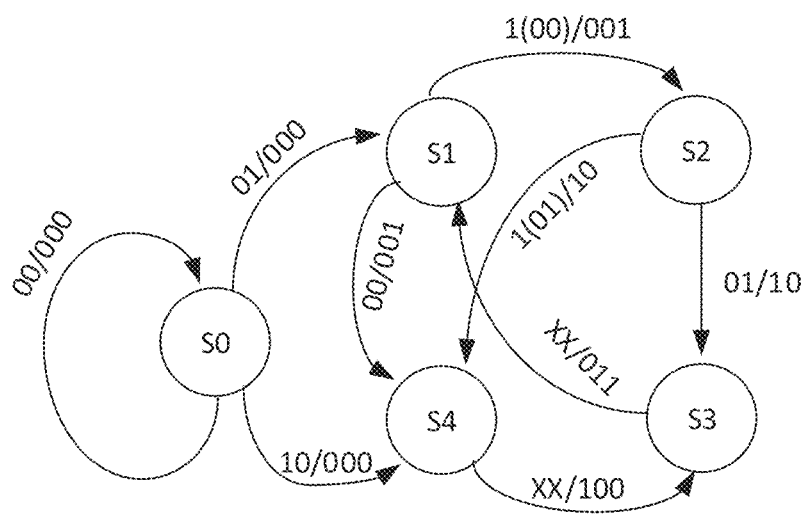
FIG. 3B illustrates an exemplary FSM state transition diagram for the design of FIG. 3A.
Figures 3C, 3D:
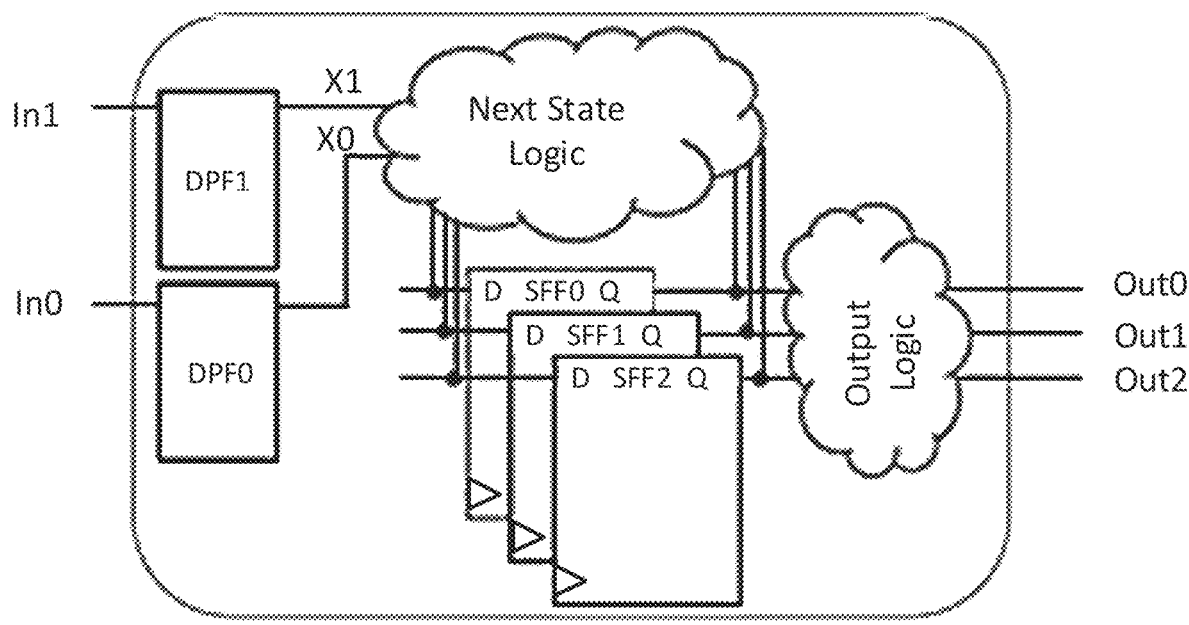
FIG. 3C illustrates an exemplary design of the FSM of FIG. 3A with an added pipeline.
FIG. 3D illustrates state traversals for the designs of FIG. 3A and FIG. 3B for a same sequence of inputs.

Let us consider the FSM shown in FIG. 3A with three state flip-flops: SFF2, SFF1, SFF0; two-bit input In={In1, In0} as part of next state logic; and three-bit control output Out={Out2, Out1, Out0}. The state transition diagram is shown in FIG. 3B which depicts that for different inputs and current state combinations, the control outputs and next states are decided. Since, the next state logic of the FSM contains the current state and inputs directly (without having data-path flip-flops), the input stimuli is readily available as part of the next state logic in the same clock period of operation of the FSM. FIG. 3D illustrates the operation of the FSM for three clock cycles where S0 is considered as the power-up or initial state and three random inputs are considered as input stimulus to the FSM. Based on the input excitation and the current state values for each clock cycle, the state traversal order follows the sequence of S0→S4→S3→S1 . . . and so on. Following the state traversal path, the FSM generates an output sequence of 000→100→011→ . . . and so on.

In another case, let us consider the same FSM shown in FIG. 3A which has the same state transition diagram shown in FIG. 3B. However, this time the input to the FSM consists of a single stage of pipeline flip-flops as shown in FIG. 3C. In this example, the FSM next state logic contains the current state and pipe-lined inputs. As a result, the input stimuli is one clock cycle delayed before being available as part of the next state logic of the FSM. Now let us apply the same input patterns as applied to the FSM in FIG. 3A. Accordingly, FIG. 3E illustrates the operation of the pipelined FSM for three clock cycles where the same three random inputs have been considered as input stimulus and the same initial state has been used. Based on the input excitation being delayed by one clock cycle and the current state values for each clock cycle, the state traversal order changes to the sequence of S0→S0→S4→S3 . . . and so on. The change in state traversal also impacts in the generation of control outputs which is 000→000→100→ . . . and so on.

Based on the discussion of the above two cases, it is evident that the later example generates different outputs, in comparison to the first example, as different state traversal orders are being followed even though same input sequence has been applied to both FSMs. In summary, the data-path flip-flops that are in the fan-in cones of the state flip-flops impact the next state logic. Hence, while initializing the design to its original power-up state from the obfuscated states, these flip-flops should be initialized to their original power-up states. Thus, such flip-flops are classified as pseudo-state flip-flops as they are not part of the FSM but impact the state traversal. In general, a realistic IP will contain all three types of flip-flops. Once classification of flip-flops is completed based on the above structural properties, a list of target flip-flops (state and pseudo-state) for obfuscation can be obtained and obfuscation process can be initiated.

In the figures, the same FSM is placed in two different designs having the same set of inputs (In=In1, In0 and outputs (Out=Out2, Out1, Out0). As shown in FIG. 3D, the state traversals of an FSM without a pipeline (FIG. 3A) and an FSM with a pipeline (FIG. 3C) are different. The FSM without a pipeline gets the direct input pattern as a state transition condition, whereas the FSM with a pipeline lags one clock cycle to get the same input pattern and that is why the state traversal does not match with the former. This finding implicates that the data-path flip-flops (DPF1, DPF2) present in the fan-in cone of state flip-flops (SFF0, SFF1, SFF2) have an indirect impact on the state traversal of an FSM. Hence, such flip-flops are included as target flip-flops for modification. Another important aspect of modifying pseudo-state flip-flops is that for maintaining functional equivalence before and after obfuscation, it is important to initialize the pseudo-state flip-flops and start the normal mode of operation from that initialization point.

State-space obfuscation enriches the existing operational state-space of an IP by introducing an exponentially large number of non-functional states which are unreachable under the normal mode of operation of the IP. In locked (obfuscated) mode, the IP will operate in this significantly large non-functional state-space and generate non-functional outputs which make the IP resistant to reverse engineering. State-space obfuscation uses two distinct approaches simultaneously to increase the reachable state-space: (1) increasing the reachability of state-space by superimposing next state logic of highly reachable FSM on the existing flip-flops in the netlist; and (2) adding extra state flip-flops to the design which get concatenated to the existing state flip-flops of the design.

Figure 4A:
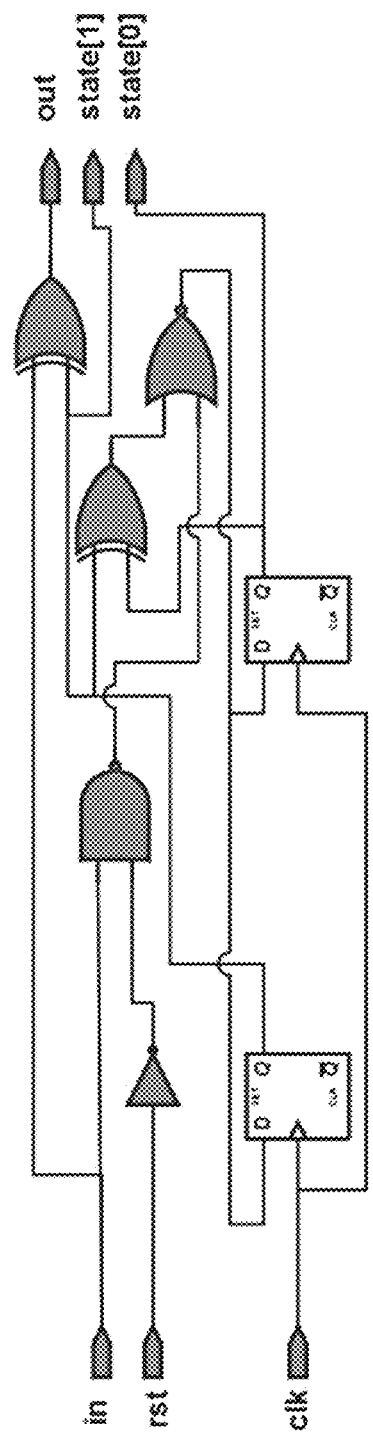
FIG. 4A illustrates two flip-flop state machines (FSM1) with reachable states in accordance with the present disclosure.
Figure 4B:
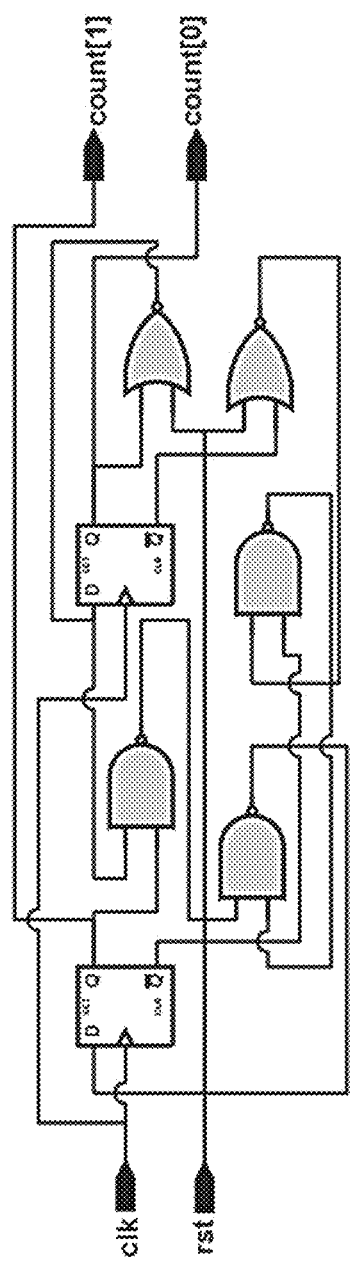
FIG. 4B illustrates a two-bit counter (FSM2) having reachable states in accordance with the present disclosure.
Figure 4C:
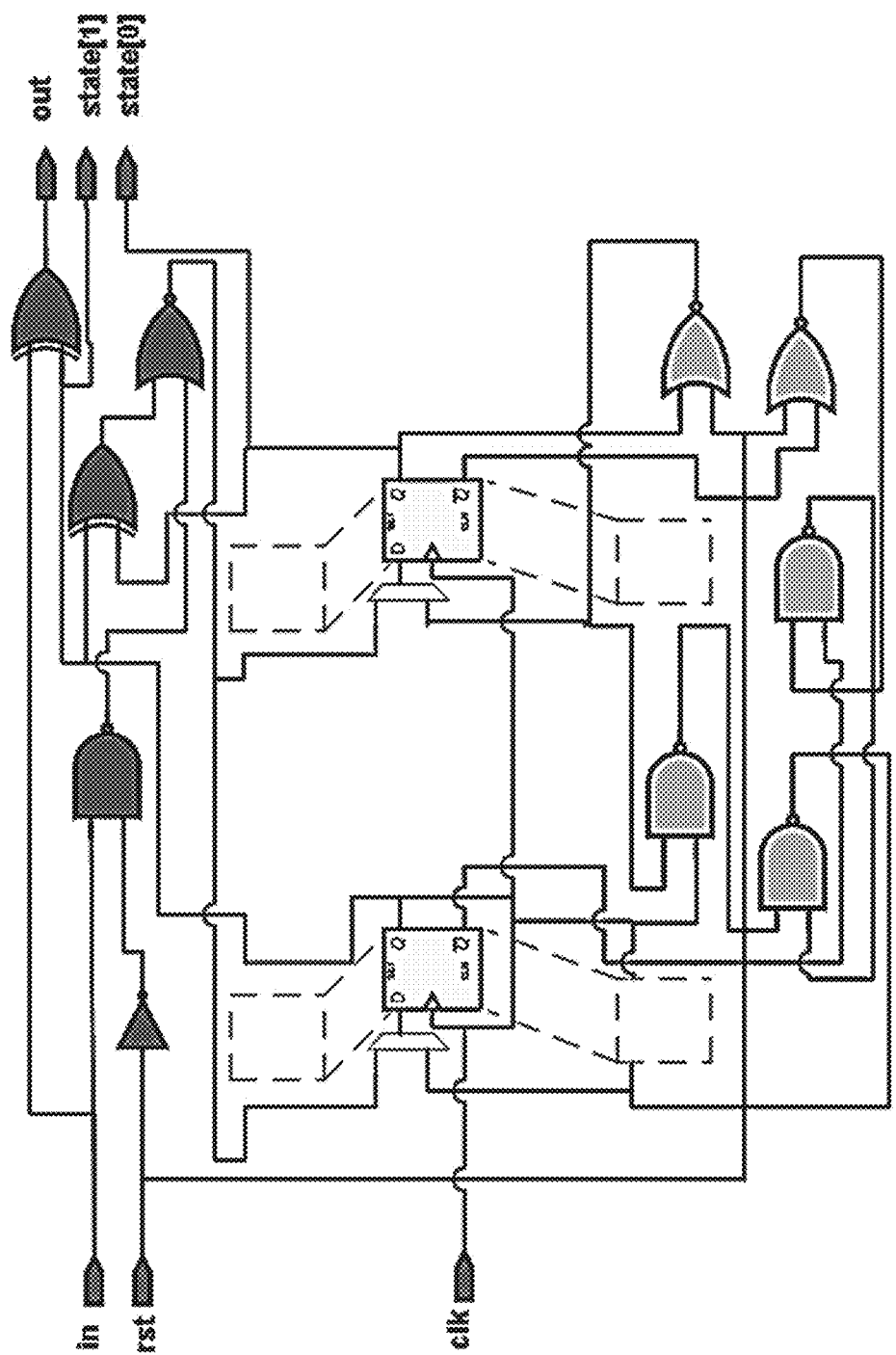
FIG. 4C illustrates a superimposition of FSM2 of FIG. 4B on top of FSM1 of FIG. 4A in accordance with various embodiments of the present disclosure.

As discussed earlier, the reachability of the FSM in an IP may not be too high which makes it easier for an attacker to reverse engineer the state machine and get the control of the IP. To address this vulnerability, state-space obfuscation algorithm incorporates superimposition of a highly reachable FSM on the existing state flip-flops of the design. Due to the superimposition, a group of flip-flops can operate as two different FSMs. Let us consider the example of a two flip-flop state machine (FSM1 shown in FIG. 4A which has two reachable states: 00 and 11. In addition, a two-bit counter (FSM2) of full reachability (4 states: 00; 01; 00; 10)

is superimposed, as illustrated in FIG. 4B. An exemplary superimposition algorithm can basically connect or glue the input and output logic of FSM2 flip-flops to the FSM1 flip-flops through multiplexing at the input as shown in FIG. 4C. Due to the superimposition on FSM1, the same group of FSM1 flip-flops, which had 50% reachability (2 out of 4), now becomes 100% reachable (4 out of 4) if the multiplexer branch of FSM2 is being selected. Although, for such a small circuit (few state flip-flops), the exponential increase is not too much, while with the increment in the number of state flip-flops in the design, the state-space explosion is significant. A variety of highly reachable FSMs can be used for superimposition. However, the choice of FSM should be of less cost, maximum reachability, and non-deterministic. Maximum period non-linear feedback shift registers (NLFSRs) are such FSMs which have 100% reachability as well as incurring minimal overhead. The next state of NLFSR is a non-linear function of the current state which marks it as secure to be used as an FSM. In an exemplary implementation, a maximum period NLFSRs are used as the superimposing FSM.

Figure 5:
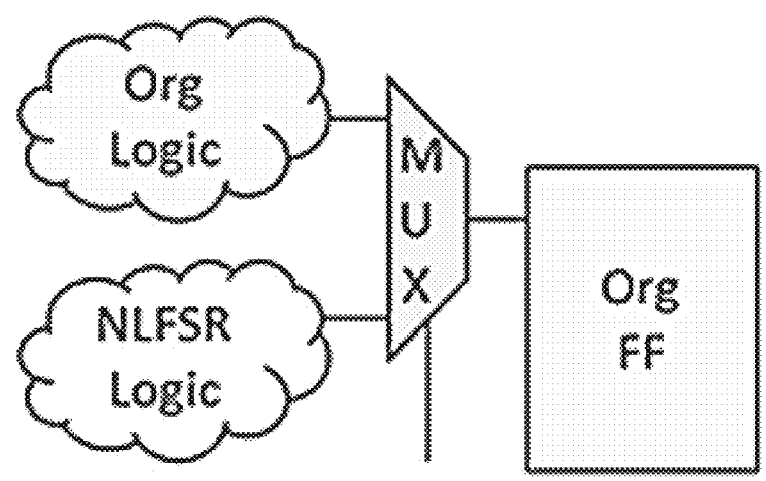
FIG. 5 illustrates a non-linear feedback shift register (NLFSR) superimposition in parallel to an original design FSM in accordance with embodiments of the present disclosure.

In various embodiments, in parallel to the original design logic at the input of a target (state/pseudo-state) flip-flop, the next state logic of a non-linear feedback shift register (NLFSR) is added using a multiplexer. The gate-level superimposition of NLFSRs are shown in FIG. 5. Here, the same FSM can operate in two modes—a normal mode (original FSM) and an obfuscated mode (NLFSR mode) based on the application of key values.

The same principle applies to a conversion of a data-path flip-flop heavy design into a control-path heavy design. For example, if a design does not have a significant amount of control path flip-flops to be modified, a right amount of random data-path flip-flops can be chosen based on the size of the design and superimposition of an HIRA on top. This step increases the number of control-path or state flip-flops in the design, to which an exemplary obfuscation method is applied, in various embodiments. Numerous sizes and configurations of NLFSRs are possible for the superimposition step that make use of known structural signatures of the FSMs by an adversary extremely challenging. Moreover, re-synthesis of the design with such NLFSRs leads to resource-sharing and logic optimization that make isolation of the NLFSRs further difficult. Note that even though NLFSRs may be used as the choice of FSMs to superimpose, other highly-reachable FSMs, e.g., a custom FSM, can also be used to improve security and reduce design overhead. The reasons of using NLFSR include less area overhead, non-linear feedback path, and 100% reachability.

For an exemplary locking mechanism in accordance with various embodiments, additional FSMs called obfuscation FSMs (OFSM) and data-path enable FSMs (DFSM) are deployed which take certain values as input conditions through primary input ports to traverse through certain states. OFSMs control whether the IP will operate in an obfuscated (locked) mode or a normal (unlocked) mode. The size of each OFSM, i.e., number of flip-flops in the FSM, can be any positive integer value. However, in one embodiment, three flip-flops as a minimum are used to make sure there are enough states for the added FSM to be used for defining three separate regions of operation of the OFSM. The three regions are the authentication region, the enable region, and the dummy region. Based on the current state of the FSM, the operating mode of the IP is decided. If the current state belongs to the authentication region or the dummy region, the design operates in the obfuscated mode. If the state value belongs to the enable region, the IP operates in the normal mode.

Figure 6:
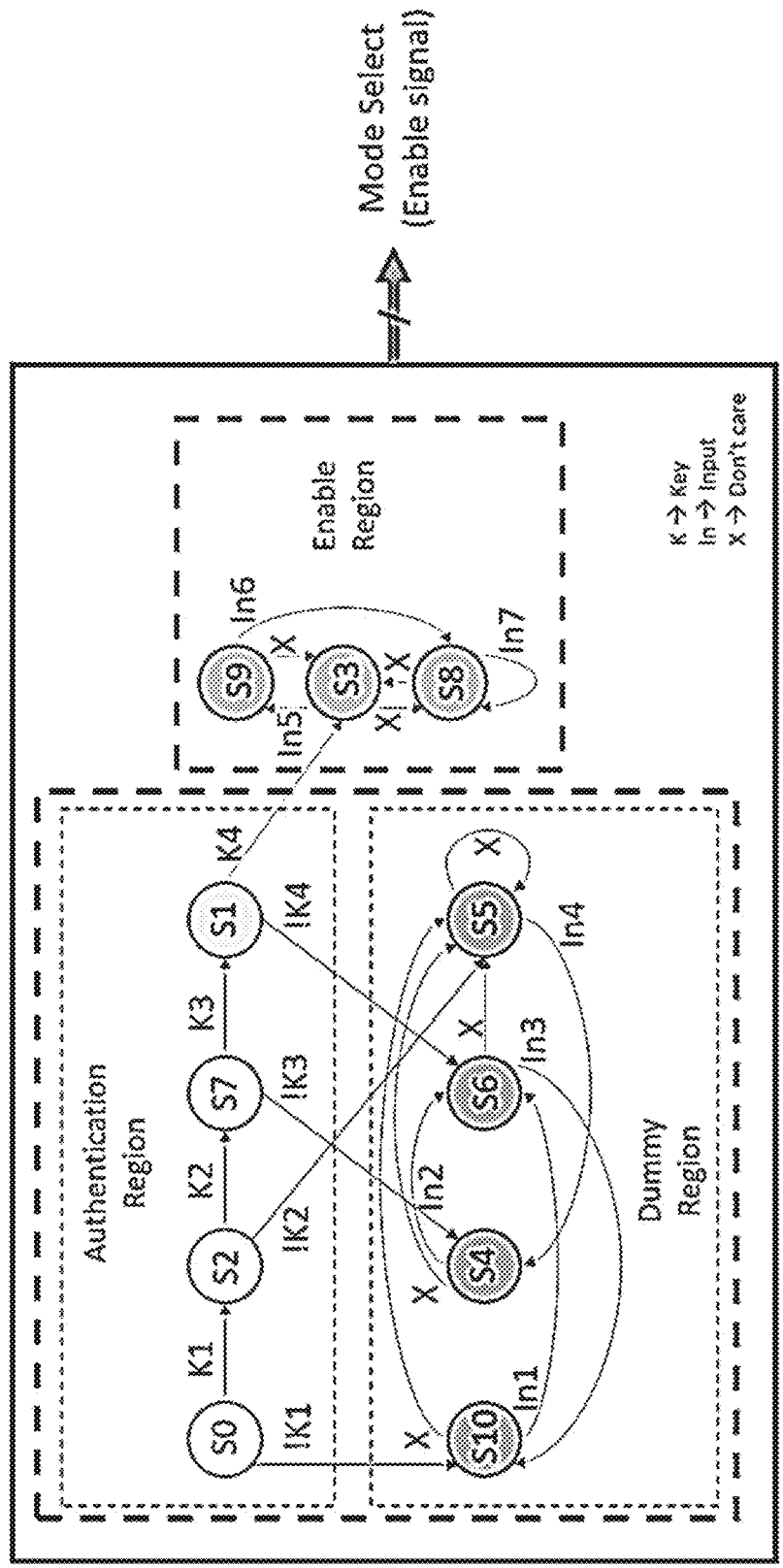
FIG. 6 illustrates an obfuscation finite state machine (OFSM) state transition diagram in accordance with various embodiments of the present disclosure.

State-space obfuscation is a key-based sequential logic locking algorithm. Unlike static keys used in combinational logic locking, in state-space obfuscation, the OFSM authentication region is used for traversing through a set of states based on a key sequence. Instead of adding extra key inputs as performed in combinational locking, a sequence of multi-bit keys can be applied via existing primary inputs of the design starting from the power-up or reset state of the OFSM. A state transition diagram of a basic OFSM is shown in FIG. 6. The power-up state is S0 from where a sequence of keys, K1→K2→K3→K4, each of multiple bits, can be applied to reach the enable region. At any point before reaching the enable region, if there is a mismatch between the correct key and applied key, the OFSM enters into the dummy region and keeps looping through the dummy region until the OFSM is brought back to its reset state. In each region, the OFSM generates a set of enable signals to configure the multiplexed input logic branch of superimposed state flip-flops. Correct enable signals are generated only in the enable region which selects the original FSM logic branch of the state flip-flop input multiplexer such that the normal mode of operation is guaranteed. Incorrect enable signals are generated in both the authentication region and the dummy region which select the superimposed FSM logic branch; hence, the obfuscated mode is placed in operation. To avoid static enable signals in the locked mode, the enable signals keep switching to random values in each state transition, where random switching may enable random logic of the IP. However, such random unlocking of a part of the design is done intentionally to deceive the attacker as only the enable region ensures that all enable signals generate correct values to enable the entire design and switch to the normal mode. To apply the key and make state transitions, existing functional inputs to the IP are chosen as key inputs.

Figure 7:
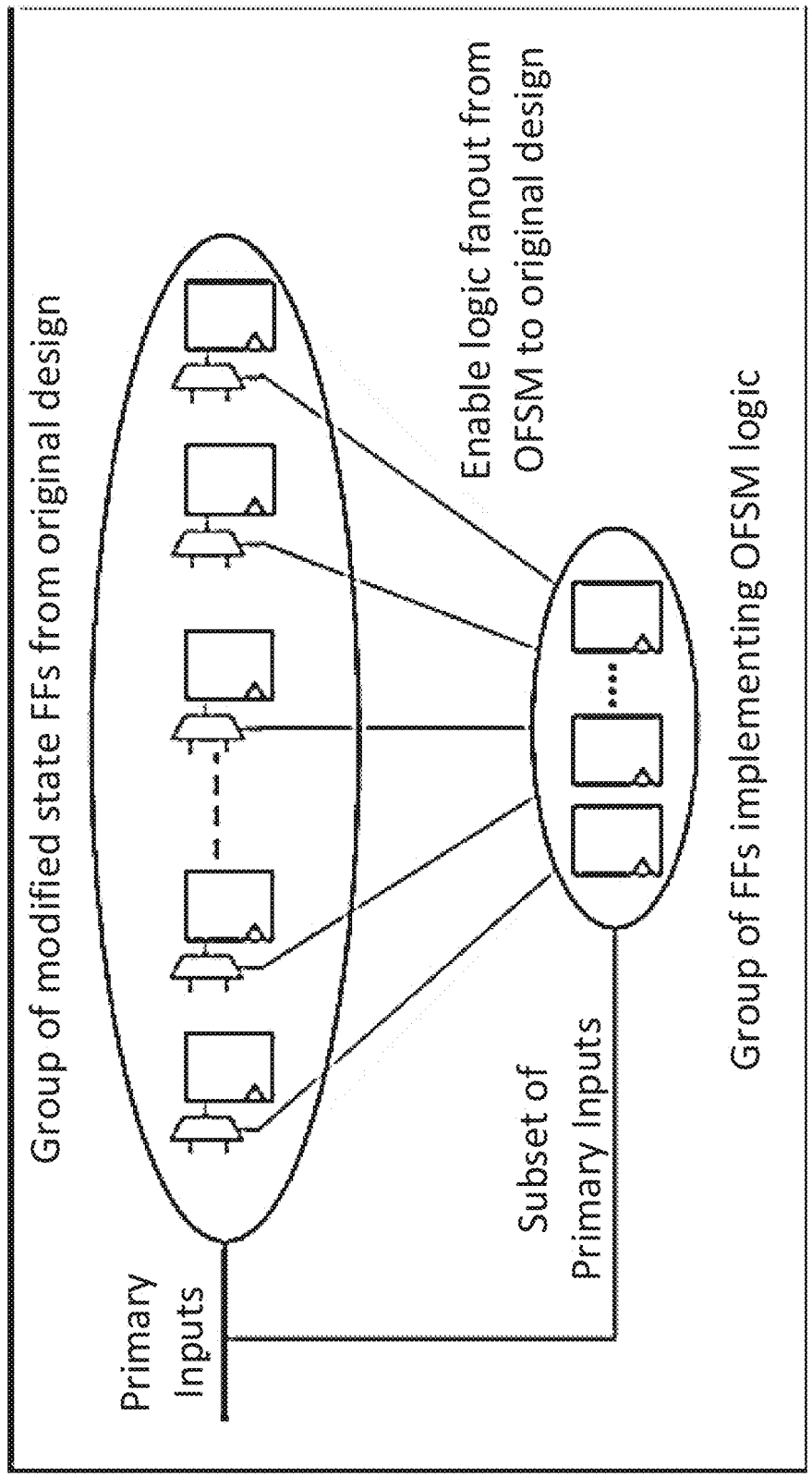
FIG. 7 illustrates a merging of an OFSM with an original design of a hardware IC (integrated circuit) in accordance with embodiments of the present disclosure.

Accordingly, in various embodiments, NLFSR logic is added in parallel to the original FSM logic with the help of a multiplexer. While merging the OFSMs with the original design, the primary inputs to the OFSMs are replaced with the existing primary inputs to the original design to avoid adding extra key inputs (which makes it SAT attack resistant) and the enable signals generated from the OFSMs drive the select input of the multiplexers which are placed in front of the state flip-flops. A block-level diagram of an OFSM being merged with an existing but modified state flip-flop array is shown in FIG. 7. Once the correct keys are applied, all the multiplexers can be configured to select the original logic branch and switch to the normal mode of operation of the design. Otherwise, NLFSR logic branches are chosen, and the functionality of the design is corrupted by entering the extended and non-functional state-space of the design.

Despite OFSMs and DFSMs being almost identical in operations, they serve different purposes for the obfuscation mechanism. The OFSMs control the sequential or FSM locking part. Upon the application of the correct key values, OFSMs activate the obfuscated flip-flops in the design to act as a part of the original design FSM. In the authentication and dummy regions, enable signals will have random values, which in return may enable a random part of the design in each clock cycle, since the enable signals will randomly switch throughout all the state transitions, in which the random and continuous switching helps to hide the enable signals. However, unusual switching activity is avoided in the obfuscation circuitries, and the original design switching activity is made similar to the obfuscation circuitries. Only the enable region will generate the correct set of enable signals and make a complete transition of operation of the circuit from the obfuscated mode to the normal mode. Based on the number of state flip-flops in the design and other design constraints, the number of OFSMs can be more than one. Unlike OFSMs, DFSMs control the combinational logic locking by generating enable signals to dictate inserted modification cells. Based on the level of expected output corruptibility, multiple DFSMs can be added, in accordance with various embodiments.

Figure 8:
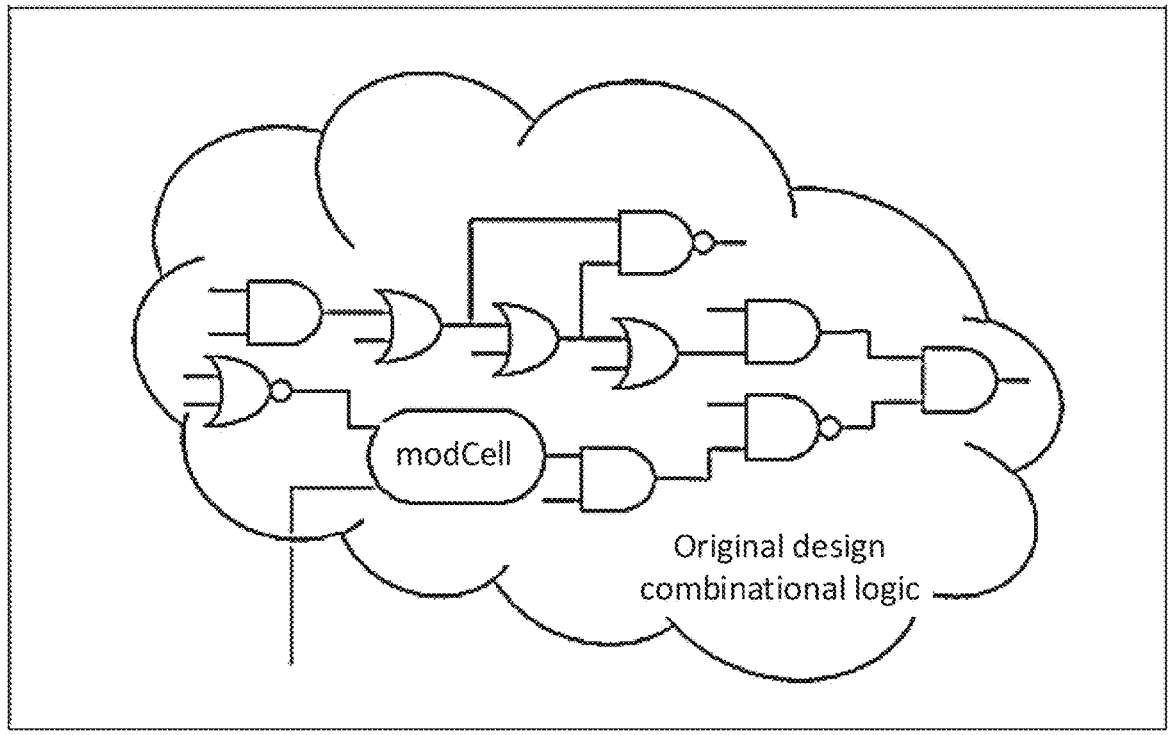
FIG. 8 illustrates insertion of a modification cell into a hardware IP design in accordance with various embodiments of the present disclosure.

To increase the output corruptibility, combinational gates called modification cells (modCell) are inserted into the original design. For example, different types of gates (XOR, XNOR, etc.) can be inserted so that the enable signals from the DFSMs can be made random. In various embodiments, modification cells can be inserted based on a simple heuristic where each node of the design will be analyzed to obtain the average of fan-in cone size and fan-out cone size of those nodes and rank them based on the average value such that higher ranked nodes will have precedence while inserting modification cells. A sample modification cell insertion is shown in FIG. 8.

Figure 9:
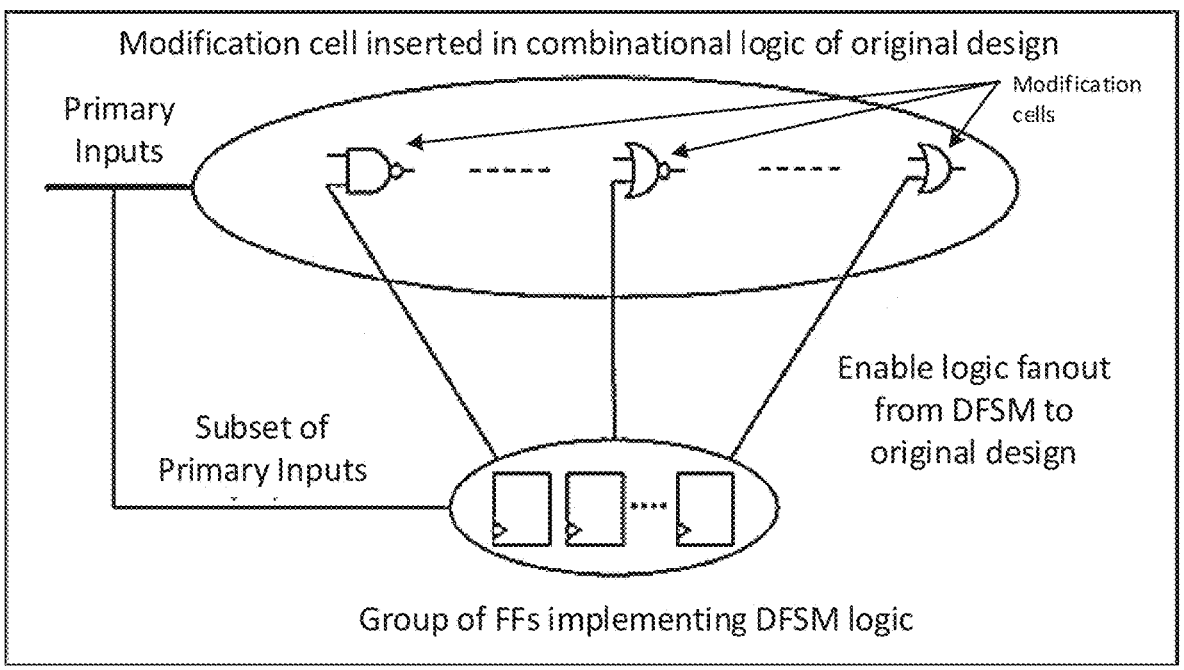
FIG. 9 illustrates a merging of a DFSM with a hardware IP design in accordance with various embodiments of the present disclosure.

In general, one of the main objectives of hardware obfuscation is to hide the design intent from the attackers to prevent unauthorized use of the IP. Structural based attacks such as template-matching are able to locate critical parts of the design (e.g., the sbox in AES), and perform local analysis to extract secret information or perform malicious modifications. Hence, a systemic structural transformation should be incorporated in parallel to the functional obfuscation to mitigate such vulnerabilities. State-space obfuscation allows an IP to be transformed structurally by inserting the modification cells in the combinational logic of the design. This approach is similar to inserting key gates as in combinational logic locking. However, the major difference is that, in state-space obfuscation, the key input to the modification cell is driven by enable signals generated from an added FSM where in combinational locking, key inputs are being driven by visible external key inputs. The added FSM which drives the modification cells is the data-path enable FSM (DFSM) as this FSM enables the data-path logic to perform the intended operation. The structure and state transition function of the DFSM are similar to that of the OFSM. The only distinguishing factor is that DFSM drives data-path or combinational logic. A block-level diagram of a DFSM merged with existing combinational logic is shown in FIG. 9.

In various embodiments, primary inputs to the DFSMs are replaced with the primary inputs and internal nets of the original design. Based on the type of the gate, the values of the enable signals generated from the DFSM can be either 0 or 1. If the correct keys are applied, the modification cells will act as buffers and allow the circuit to operate normally. If not, the cells will produce incorrect output logic and corrupt the functionality.

In order to achieve maximum structural transformation through obfuscation, a set of optimal nodes are chosen. Although the insertion of modification cells in a random location will transform the design structure, algorithmic insertion serves better. To increase the number of failing equivalent nodes for any obfuscated design in formal verification, nodes are chosen that have high averages of fan-in logic and fan-out logic. The nodes having high fan-in logic indicates the high logic depth, whereas high fan-out logic indicates that the node modification will most likely impact a large portion of the design output. If we assume the number of nodes (gates) in the fan-in cone of a node is FI and the number of nodes in the fan-out cone of the node is FO, then, the following equation can be used to rank a node for modification cell insertion:

$$\text{rank} = \frac{FI + FO}{2}. \quad (1)$$

Once ranked, the higher ranked nodes are chosen to insert modification cells, e.g., AND/OR/XOR/XNOR/any combination of cells. Due to the addition of modification cells, the existing combinational logic gets blended with the FSM logic which transforms the design structure significantly during the synthesis and optimization process. In addition, a new set of flip-flops can be added which enhances the state-space explosion further.

As previously discussed, a large number of non-functional states can be added that precede the normal mode of operation. The addition of extra states prior to the functional (initial) state may turn out to be hazardous in terms of maintaining functional equivalence once the IP is unlocked. In accordance with various embodiments, during the key application period, in the process of unlocking the IP, the entire IP operates for multiple clock cycles and node values of each of these periods are of greater importance for designs having state machines and/or flip-flops. Additionally, the existing state flip-flops have a highly reachable FSM being superimposed which can enable the existing FSM to reach a random non-functional state. That is why it is important to initialize all the state flip-flops to the initial state of the original design once the correct key is applied, which will preserve the functional equivalence between the non-obfuscated original design and the unlocked obfuscated design.

In order to initialize the original design state flip-flops to the initial/reset/power-up state, the state or output of each state flip-flop should be known or identified when the design is being reset under the normal mode of operation. To find those values, the non-obfuscated design can be simulated under reset for multiple clock cycles which will allow a consistent value to appear at the output port of each flip-flop. In this way, the initial state for the entire design can be recorded.

Figure 10A:
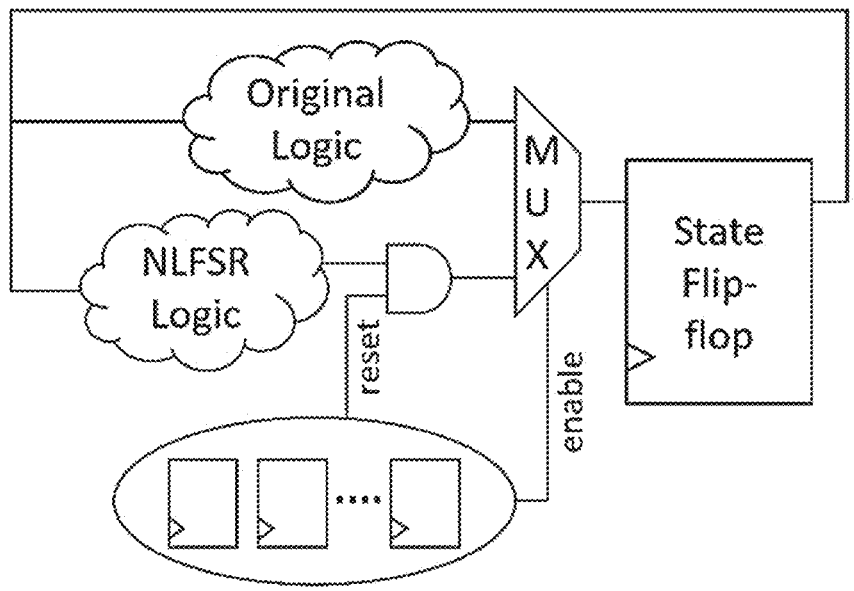
FIGS. 10A-10c illustrate an initialization of a state flip-flop in accordance with various embodiments of the present disclosure.

Once unlocked, the state-space obfuscation can initialize all the state and pseudo state flip-flops to their initial state that has been recorded from the functional simulation. The added OFSM can be used to force each of the state flip-flops to pass a constant (reset state value) to the output of each flip-flop through the data input of the same flip-flop. To allow such constant propagation (in addition to the enable signals generated from the OFSM), a set of new signals can be generated (or derived from the enable signals) against each state of the OFSM, in which the new signals contain the reset values required to initialize each of the flip-flops. It is not necessary to generate one signal for each flip-flop. To minimize overhead, one signal can drive several flip-flops under a maximum fanout constraint (if any) to avoid high fanout and other potential structural vulnerabilities. In accordance with various embodiments, the reset signals will merge with the obfuscation logic branch (NLFSR) of the multiplexers that are present at the input of the state flip-flops via combinational gates (also referred to as initialization gates). The type of initialization gate used can be decided by the reset value required for one particular flip-flop and the value of the reset signal. For example, let us consider the flip-flop shown in FIG. 10A which is initialized to 0. If the reset signal value is 0, the initialization gate should be an AND gate to make sure the logic input to the obfuscation branch of the multiplexer becomes 0 as the other input to the AND gate will be driven by random (NLFSR) logic. If the reset signal value is 1 and the initial state for a flip-flop is 0, the gate should be a NOR gate. Accordingly, different types of gates can be required for different combinations of the reset signal value and initial state value.

Figure 10B:
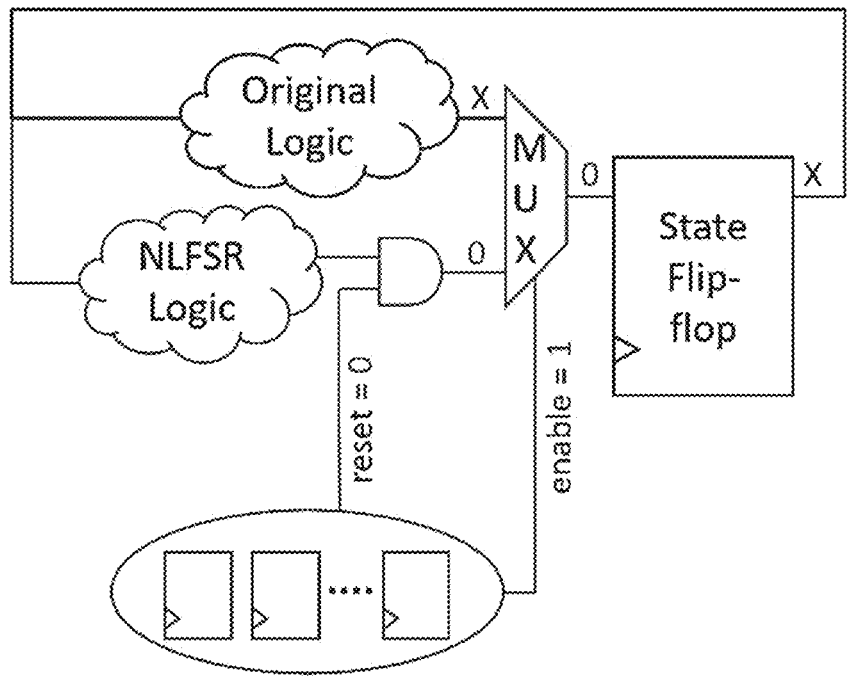
Figure 10C:
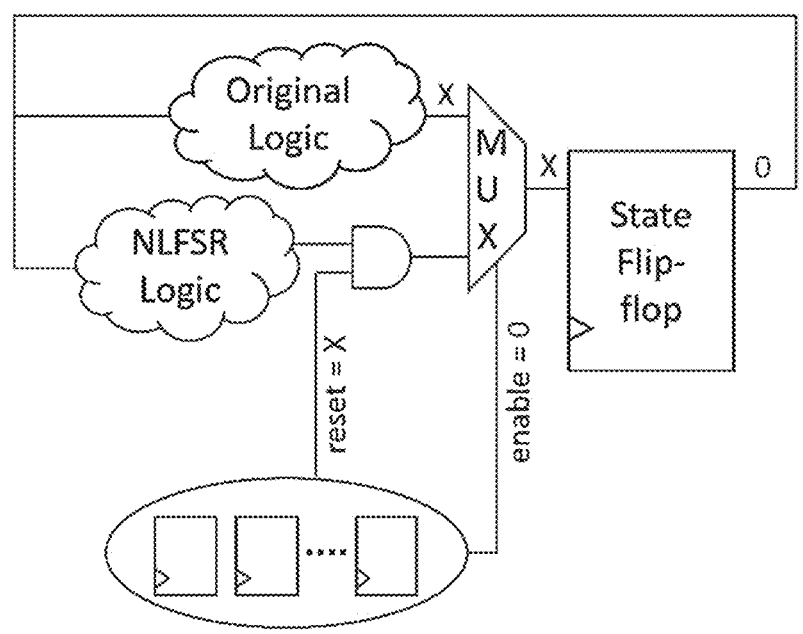

The initialization gate configures the obfuscation logic branch to force a particular value to the input of the flip-flop (output of the multiplexer) provided that a multiplexer select signal chooses the obfuscation logic branch (NLFSR branch). To sync every possible structure, i.e., state of the OFSM, the value of the reset signal, select signal value of multiplexer, and the output (initial state) of the flip-flop, the OFSM should have one initialization state or pre-enable state prior to entering the enable region. In the pre-enable state (FIG. 10B), the enable signals generated from the OFSM will choose the NLFSR logic branch which has a constant value (reset value of that particular flip-flop). Such a configuration permits a constant to be pushed to the input of the state flip-flop which is independent to the operation of the other logic of the obfuscated IP. When the OFSM switches from a pre-enable state (FIG. 10B) to the enable state (FIG. 10C) (one clock cycle apart), the value at the input to the flip-flop passes through the flip-flop (due to clock port excitation) and appears at the output of that flip-flop. In this way, the output of the flip-flop holds the initial state value and the input of the flip-flop holds the original design logic branch by configuring the multiplexer with a correct enable signal at the select input. Such configuration of the flip-flop results in a normal mode of operation. Similar modification should be applied to all state flip-flops to enable the normal mode of operation for the entire IP. The initialization and switching to enable regions are illustrated using FIGS. 10B-10C.

Based on the type of reset logic and type of flip-flops used to map the design to a gate-level netlist, some exceptions in initialization may need to be taken care of, including (1) multiple OFSMs for a large IP may initialize the design over multiple clock periods which will not initialize the entire design at once leading to a functional disruption; and (2) flip-flops with a CLEAR/SET port may nullify the forcing of a constant through the data input as control ports (CLEAR/SET) have precedence over the data input port.

With regards to designing multiple OFSMs, commercial IPs are typically large IPs with a high number of state flip-flops. To prevent high logic fan-out from OFSMs, and/or obvious structural signatures, the pool of state flip-flops can be divided into multiple chunks instead of using one OFSM to drive all state flip-flops. Each of these chunks can be driven by one OFSM, which involves having multiple OFSMs to drive the entire state flip-flop pool. While designing multiple OFSMs, it is important to make sure that all the OFSMs initialize the state flip-flops before switching to the enable region at the same time. In order to maintain the consistency with switching to the enable region for all OFSMs, the pre-enable state of each OFSM should stay in the same state unless all the OFSMs reach their corresponding pre-enable states. This will ensure the entire design is initialized at the same time. Once all OFSMs are in the pre-enable states, they can be triggered to switch to the enable states simultaneously and start normal operation.

With regards to the modification of flip-flops with control ports, a standard cell library mapped gate-level netlist may contain different types of flip-flops among which a flip-flop with a control port (CLEAR/SET) may exist. As the control ports have precedence over a data input port, it may not be always possible to force an initial state value to be passed through the flip-flop from its input port to its output port without knowing the value of the control port. For example, if the CLEAR pin is asserted to clear the flip-flop and force the output to be 0, even if the input port value changes between 0 and 1, the output port will always be at 0 for however many clock cycles the CLEAR is asserted. This fundamental property of the flip-flop will interfere with the initialization mechanism described earlier and may lead to corrupted initialization. To avoid such an incident, the type of flip-flops can be modified without changing the functionality of the particular flip-flops. Examples are provided below of two different types of flip-flop modification: a synchronous clear flip-flop and an asynchronous set flip-flop (both active low controlled). Similar algorithms can be applied if other types of flip-flops are being encountered. A goal of the modification is to replace the flip-flop by a conventional D-type flip-flop without any control port.

Figure 11A:
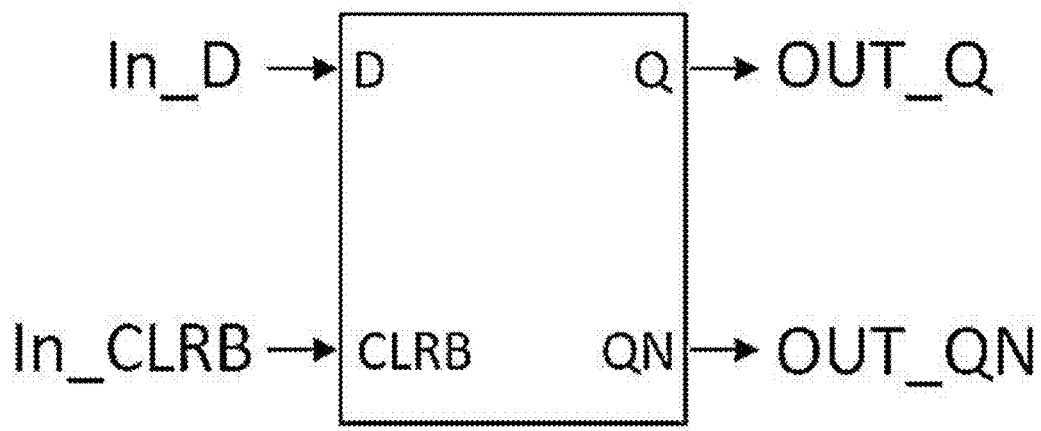
FIGS. 11A-11B illustrate a modification of a flip-flop with a synchronous clear port in accordance with various embodiments of the present disclosure.
Figure 11B:
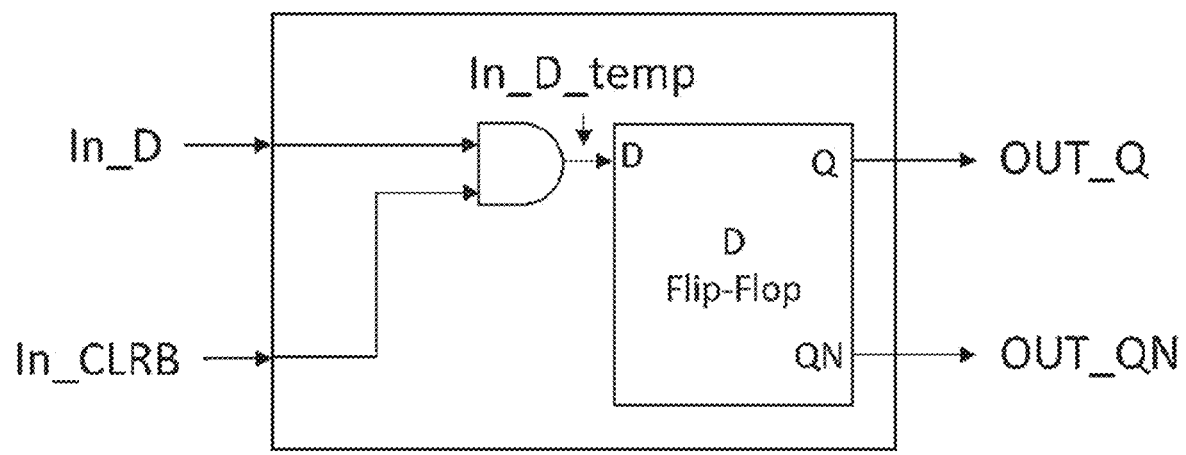

A synchronous clear flip-flop, shown in FIG. 11A, has In_D connected to the input (D port) and In_CLRB connected to the clear port and two outputs: Out_Q (Q port) & Out_QN (QN port). The clear port (CLRB) is an active low sensitive port, i.e., a logic 0 will clear the flip-flop's output to logic 0. This type of flip-flop can be replaced by a D-type flip-flop by tying an AND gate to the D port, while one of the inputs to the AND gate will be driven by the data input of the flip-flop (In_D) and the other input will be driven by the clear input (In_CLRB). Accordingly, a modified synchronous clear flip-flop is shown in FIG. 11B. Such modifications will create an internal net (In_D_temp) which is a direct input to the D-type flip-flop and can be modified to include multiplexed logic, as discussed earlier. Initialization can be performed without any interference of the clear logic (In_CLRB) for the modified flip-flop.

Figure 12A:
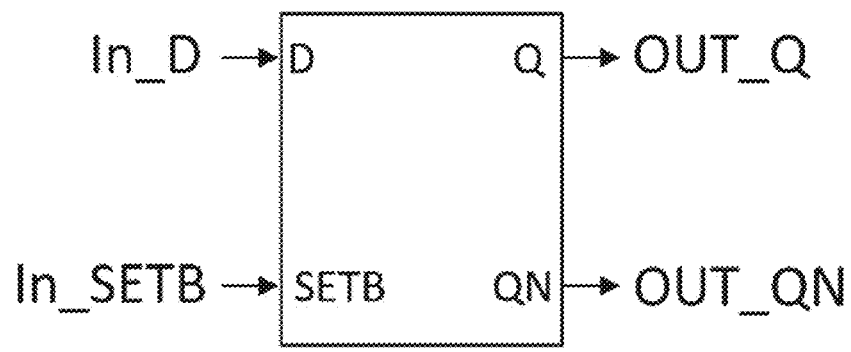
FIGS. 12A-12B illustrate a modification of a flip-flop with an asynchronous set port in accordance with various embodiments of the present disclosure.
Figure 12B:
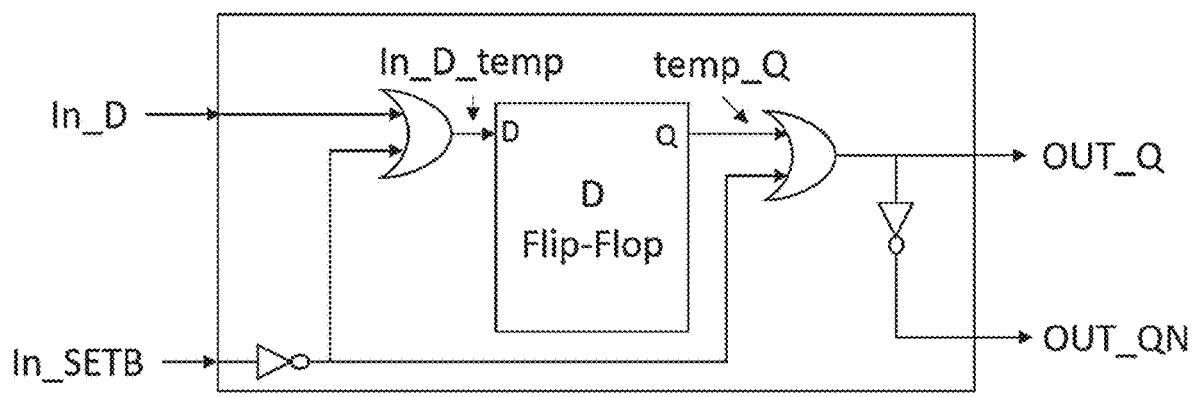

An asynchronous set flip-flop, shown in FIG. 12A, has In_D connected to the input (D port), In_SETB connected to the set port, and two outputs: Out_Q (Q port) & Out_QN (QN port). The set port (SETB) is an active low sensitive port, i.e., a logic 0 will set the flip-flop's output to logic 1. This type of flip-flop can be replaced by a D-type flip-flop by tying an OR gate to the D port as well as the Q port of the flip-flop. While one of the inputs to the OR gate at the D port will be driven by the data input (In_D), the other input will be driven by inverted set input (In_SETB). For the OR gate at the Q port of the flip-flop, one input will be driven by the D-type flip-flop's output (temp_Q) and the other input will be driven by the inverted set input (In_SETB), which ensures that the input logic of the flip-flop remains intact in terms of functionality. The purpose of the OR gate at the output port of the D-type flip-flop is to maintain the asynchronous behavior. The output of the inserted OR gate at the output port of the flip-flop will be the functional output of the replaced flip-flop (Out_Q) and an inverter will create the inverted output of the replaced flip-flop (Out_QN). Accordingly, a modified asynchronous set flip-flop is shown in FIG. 12B. Such modifications will create an internal net (In_D_temp) which is a direct input to the D-type flip-flop and can be modified to include multiplexed logic, as discussed earlier. Initialization can be performed without any interference of the set logic (In_SETB) in the modified flip-flop.

Although it is important to make sure all flip-flops can be initialized without interference from control ports, not necessarily all flip-flops with control ports should go through the modification step. Only the flip-flops who have control ports, which cannot be accessed from primary inputs (e.g., primary reset input) and driven by internal nets, should be modified as controllability is low for those flip-flop ports. For example, the flip-flops which have a control port driven by output of another flip-flop should be modified using the modification algorithm detailed in previous sections. Otherwise, flip-flops driven by reset logic at the control port can be left untouched.

Completion of the tasks mentioned above results in an obfuscated gate-level design. To remove any signature and hierarchical boundaries, synthesis of the design is performed on the obfuscated design. In addition to the structural transformation the design undergoes via the obfuscation process, synthesis of the obfuscated design helps further transformation of the whole design. Due to the synthesis process and logic optimization, the obfuscation circuitries share logic with the original design and prevent structural signature, isolation of the added logic, and other potential attack vectors.

As noted previously, despite rigorous research efforts to solve the hardware IP problem using obfuscation, existing obfuscation techniques are not resistant to numerous attacks. Although most of the focus of attack resiliency of obfuscation techniques has been on combinational locking, Table 1 (below) compares the attack spaces on hardware obfuscation for both combinational and sequential locking, in which attack vectors that can be analyzed to attack combinational and/or sequential obfuscation techniques are categorized. Most of the combinational locking techniques have been proven to be breakable using a number of attacks. For sequential locking, the attack space is completely different, and a unique set of attacks needs to be formed. Thus, a new set of attacks applicable to sequential obfuscation have been derived and are discussed in the pages that follow along with novel defenses against such attacks in accordance with embodiments of the present disclosure.

TABLE 1

| Attacks | On Comb. Locking | On Seq. Locking |
|---|---|---|
| Boolean Satisfiability (SAT) | ✓ | Limited |
| Key Sensitization (KSA) | ✓ | Difficult |
| Logic Removal | ✓ | Limited |
| Flip-flop Removal | X | ✓ |
| State-space RE | X | ✓ |
| Manipulation of Enable Signals | X | ✓ |
| Activity and Probability Analysis | X | ✓ |
| Fanout Analysis | Limited | ✓ |
| Flip-flop Initialization | X | ✓ |

Figure 13A:
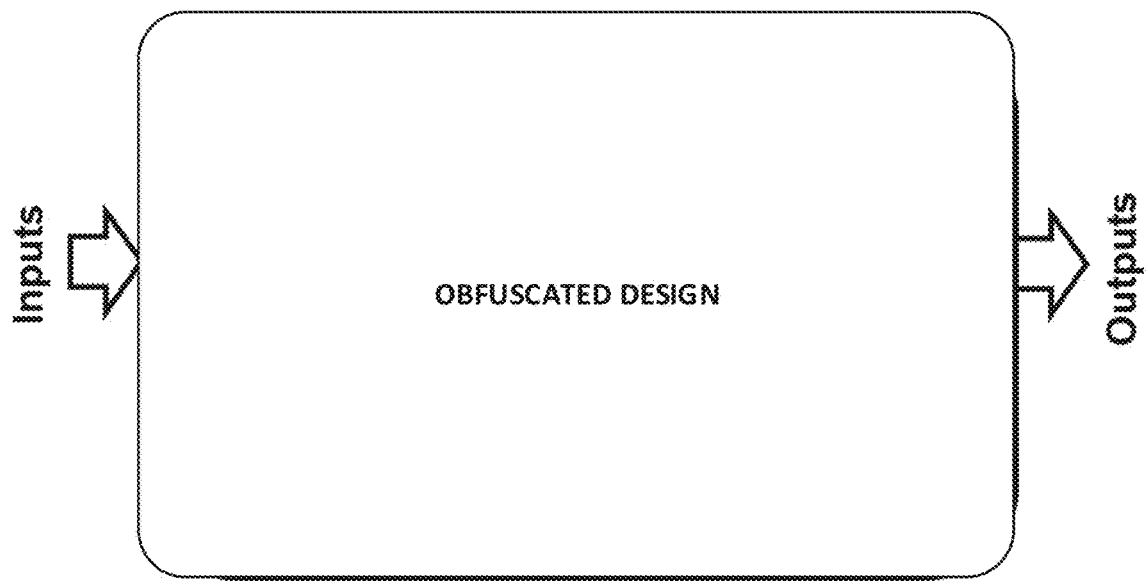
FIG. 13A illustrates a black-box attack on an obfuscated design in accordance with the present disclosure.

Existing combinational locking approaches use additional primary inputs as key inputs, which makes it easier for an attacker to traverse the key input space. The attacker can use the design as a black box and prune the key space using SAT and KSA. For Black-Box Attack Complexity, let's consider that an attacker obtains access to a locked fabricated chip as well as an unlocked chip. The attacker may then try to break into the locked IC using the unlocked chip as a golden reference. We assume that the attacker is not able to reverse engineer the chip using physical attacks or does not have access to the physical design which means the attacker sees the chip as a black box and has access to the I/O interface only (FIG. 13A) and does not see the underlying logic gates and wires. In addition, let's assume that the attacker somehow knows the length of the sequence of keys and width of each key (both of these are very strong assumptions which favor the attacker). The goal of the attacker would then be to find the unlocking key sequence by applying random patterns to the input ports and hoping that, at some point, the output from the chip under attack will match with the unlocked chip.

For state-space obfuscation, an additional input for key values is not added. Instead, the existing primary inputs are used as key inputs (as shown in FIG. 7 and FIG. 9). Additionally, an exemplary method of the present disclosure does not have explicit key values. Rather a sequence of keys is used to configure the normal mode of operation, which creates an exponential complexity, called black-box attack complexity or BBC which can be defined as:

$$BBC = 2^{PQ}. \quad (2)$$

Here, P=width of each key of the sequence, and Q=length of the sequence. BBC is directly dependent on the key and can be exponentially large for a small input space and sequence length.

Black-box attack complexity quantifies the number of trials an attacker has to go through to find the entire correct key sequence required to unlock the locked chip. In each trial, the attacker needs to verify the key by applying test patterns to both the chip under attack and the unlocked chip and check the equivalence of the outputs. Additional factors that need to be considered is that the attacker will also need to find out which primary inputs are being used for key application, and the number of combinations for the primary input will need to be considered to get the actual attack complexity value. As such, Eqn. 2 calculates the minimum number of trials without considering these additional factors.

Figure 14A:
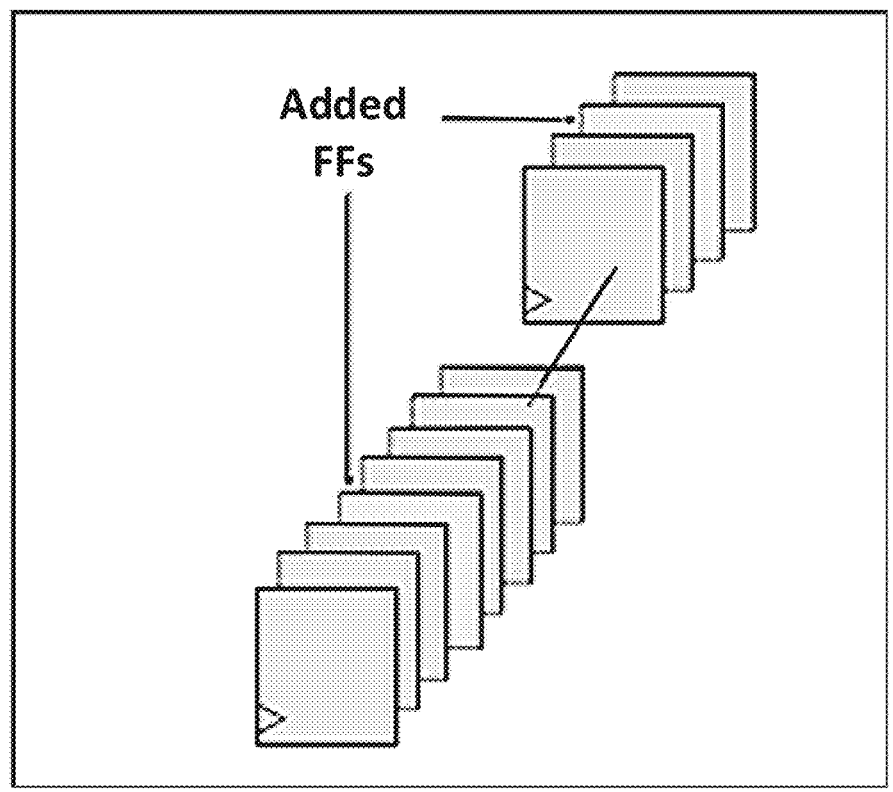
FIGS. 14A-14B illustrate the adding of flip-flops to implement a locking mechanism on a hardware IP design and the dependency of control outputs on original FSM flip-flops and added FSM flip-flops to prevent isolation of the locking mechanism in the hardware IP design in accordance with embodiments of the present disclosure.
Figure 14B:
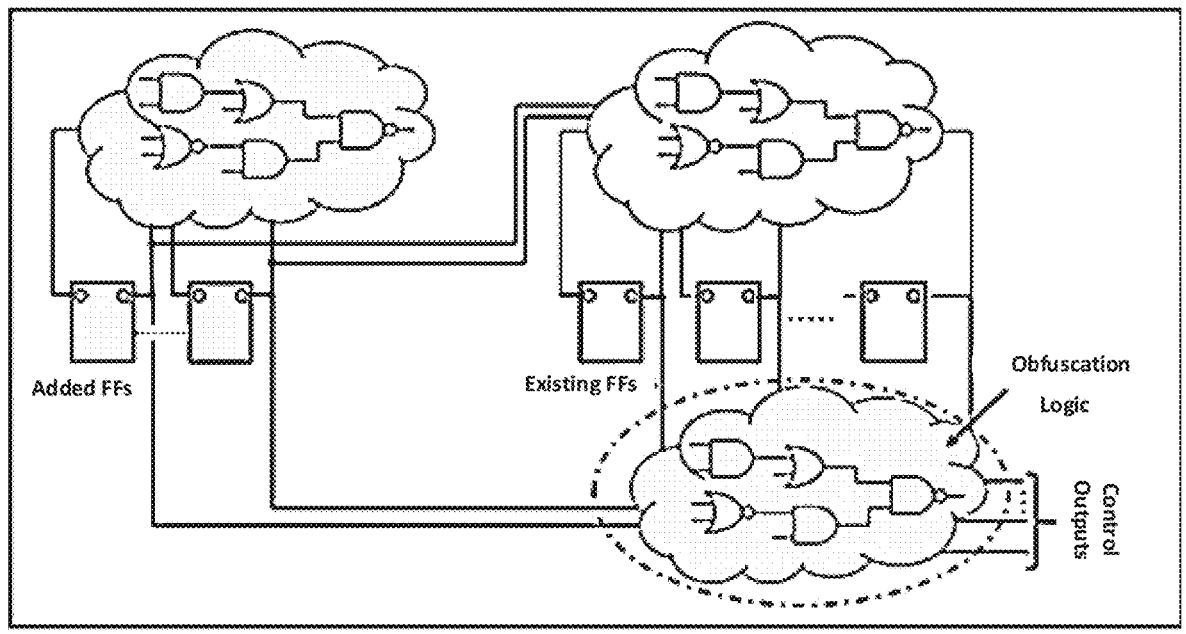

Several flip-flops can be added to implement locking FSMs in various embodiments, as illustrated in FIG. 14A. Such added flip-flops are key assets for the obfuscated design. Correspondingly, a goal of an attacker would be to find these added flip-flops from the large number of flip-flops in the obfuscated design and remove the obfuscation circuitries along with the flip-flops. An attack vector for successfully identifying the added flip-flops would involve analyzing the fan-in cone of the control outputs to see if the control outputs are being driven by both original flip-flops and added flip-flops. As shown in FIG. 14B, the control outputs are configured so that the fan-in cones of these control outputs have both added and existing flip-flops, which helps to prevent the isolation and removal of added flip-flops.

In accordance with the present disclosure, a main objective of state-space obfuscation is to prevent the state-space enumeration by increasing the reachability of the state-space of a design. An attacker with white-box accessibility of a design can identify the state flip-flops and try to reconstruct the control FSM by reverse engineering the state-space. However, it is a feasible attack only if the size of the FSM is quite small and the reachability is low. By superimposition of an H IRA, the reachability of an FSM is increased to the maximum. Hence, it is now more complex to enumerate the state-space.

Figure 13B:
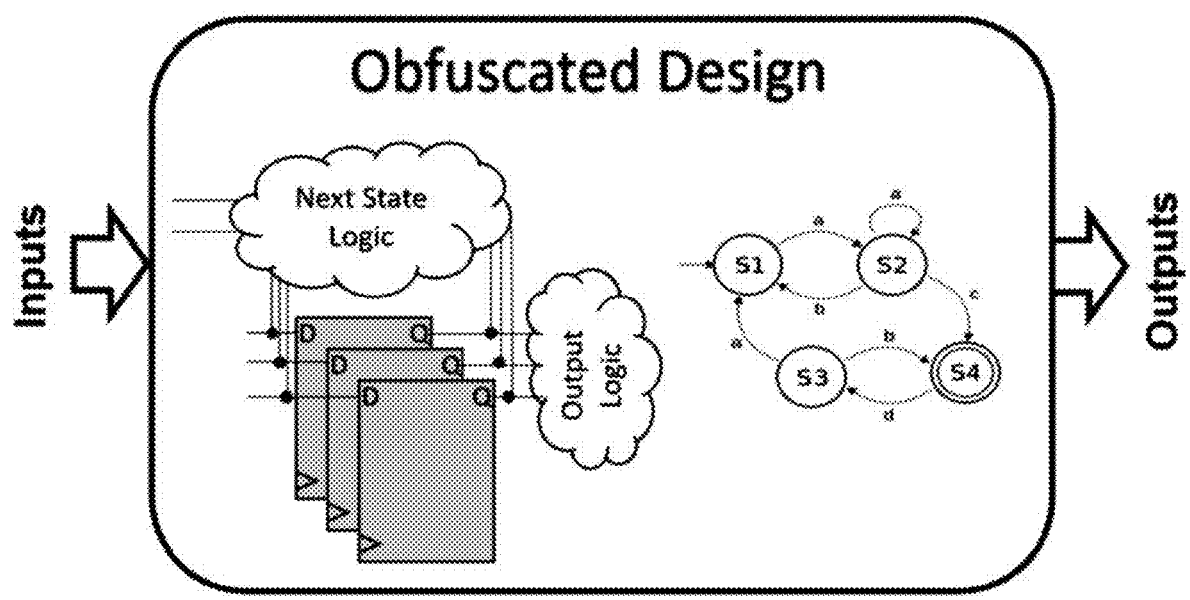
FIG. 13B illustrates a white-box attack on an obfuscated design in accordance with the present disclosure.

For white-box attack complexity, let's consider that an attacker obtains access to a locked netlist or layout as well as an unlocked chip. The attacker may try to break into the locked IC using the unlocked chip as a golden reference. Let's assume that (1) the attacker has access to the underlying logic gates and wires, as shown in FIG. 13B, since the design under attack is a gate-level netlist or layout; (2) the attacker is also aware of the structural difference between a state flip-flop and a data-path flip-flop which will help the attacker to focus only on the state flip-flops; and (3) that the attacker somehow knows the number of added flip-flops which means the attacker knows the number of flip-flops before obfuscation or the number of original state flip-flops in the non-obfuscated design (this is a very strong assumption which favors the attacker).

A goal of the attacker would be to force the design to be enabled. To reduce the effort involved, an intelligent attacker will try to isolate the added flip-flops and reverse engineer the state-space for the added flip-flops to find the enable region. The attacker will also randomly choose a subset of all the state flip-flops present in the design assuming the subset is the added flip-flops and then reconstruct the added state-space to find the enable states; force the chosen subset of state flip-flops to a state and hope that it is an enable state that enables the locked netlist; and verify a successful attack by matching the outputs from golden reference and the design under attack.

Figure 15A:
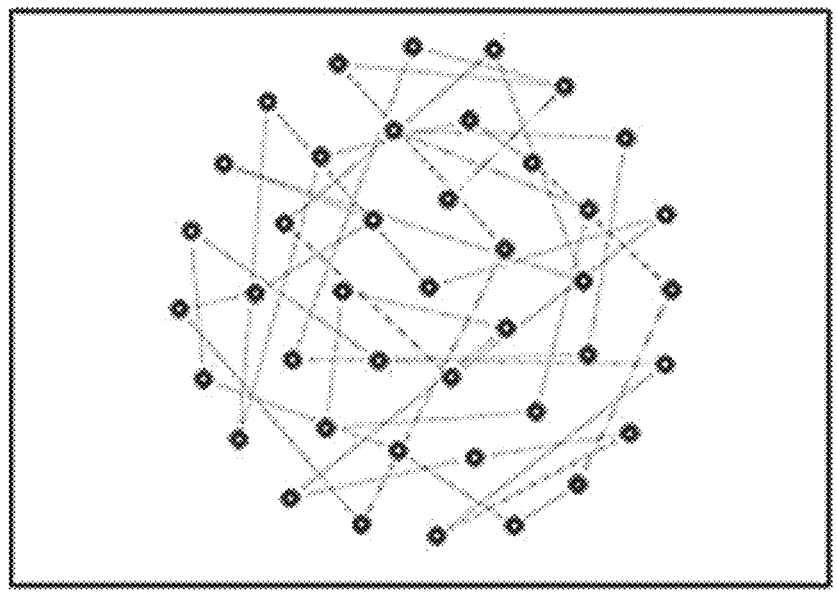
FIG. 15A illustrates an original design state-space for a small sample design in accordance with the present disclosure.
Figure 15B:
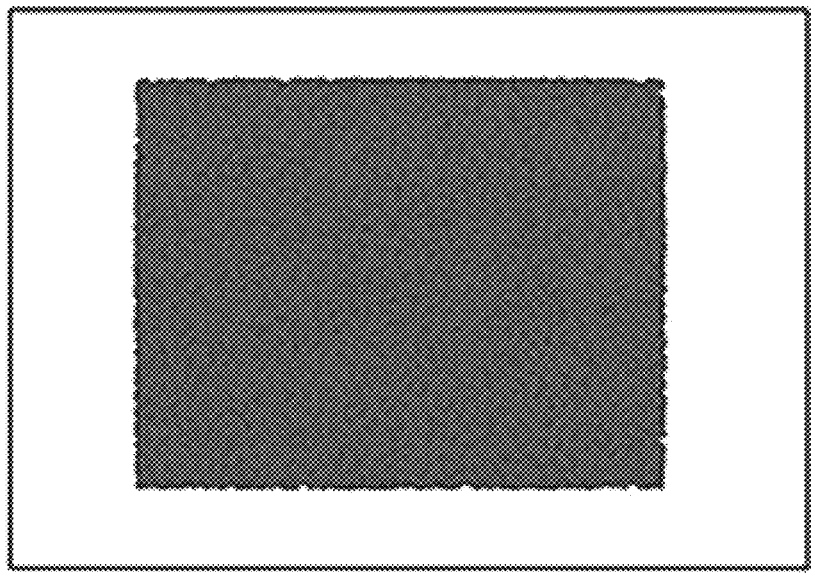
FIG. 15B illustrates a significant increase in the number of reachable states for the small sample design of FIG. 10A after insertion of 6 additional flip-flops in accordance with various embodiments of the present disclosure.

For example, FIG. 15A shows a sample circuit having 12 flip-flops that are modified using an exemplary state-space obfuscation technique and the corresponding state transition graphs, in which the original design has 42 reachable states in total. After 6 additional flip-flops are inserted, the number of reachable states increases to 183500, as shown in FIG. 15B (where the density of reachable states appears as almost a solid block). This significant increment creates a huge complexity for reverse engineering that is referred to as the white-box attack complexity. For any design, the white-box attack complexity can be defined as the number of iterations required to find the functional states as well as the state transition graph from all the reachable states in the obfuscated design. If the number of state flip-flops before obfuscation is n and the number of added flip-flops is r, the white-box attack complexity can be defined as:

$$WBC = {}^{n+r}C_r \times 2^r. \quad (3)$$

As such, white-box attack complexity quantifies the number of trials an attacker has to go through to find one of the enable states of the added FSM (or one combined enable state for all added FSMs) that enables the normal mode of operation. In each trial, the attacker will need to verify the enable state by applying test patterns to both the netlist under attack & the unlocked chip and checking the equivalence of the outputs. As we are favoring the attacker by giving access to the value of n and r, Eqn. 3 calculates the minimum number of trials which does not consider the factor of finding the value of n or r. To extract the original functional design, an attacker will have to deal with the expanded state-space to find the functional states of the original design and then have to find the state transitions in the design.

Figure 16:
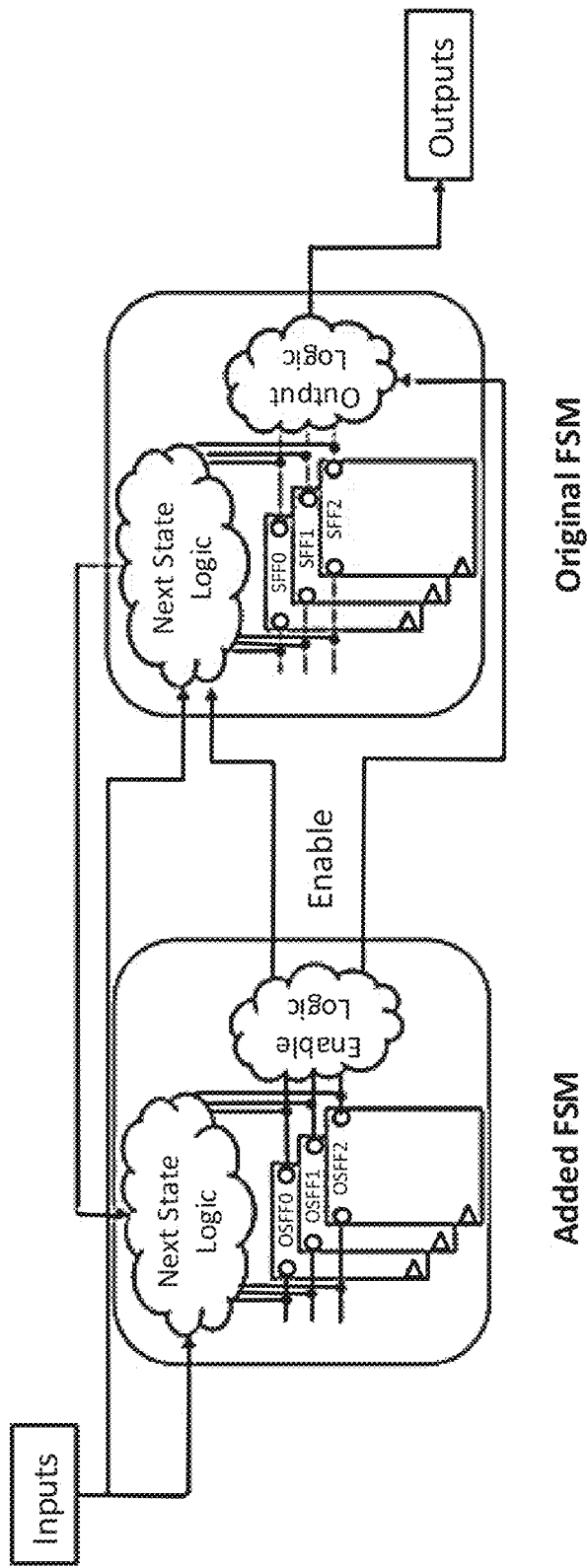
FIG. 16 illustrates an operation in which added FSMs are made dependent on existing FSM state values to prevent manipulation of enable signals in accordance with embodiments of the present disclosure.

The enable signals generated by the locking FSMs can also be a point of interest for an attacker. Identification of enable signals may lead to the manipulation of those signals and ultimately reveal the added flip-flops. To prevent such manipulation, in various embodiments, the enable signal fan-in cones are set to contain the added and original flip-flops, which can be achieved by making the added FSM state transition dependent on the state transition of the original FSM. Hence, while designing the OFSM and DFSM, the state values in the original design are considered as a condition for the state transition of OFSM/DFSM in the locked mode of operation. FIG. 16 shows the structural configuration of added FSMs to replicate the dependency of enable signals on both added and existing FSMs, in accordance with various embodiments of the present disclosure. Additionally, in various embodiments, the enable signals have random values and switch randomly in each transition to hide their characteristics.

Figure 17:
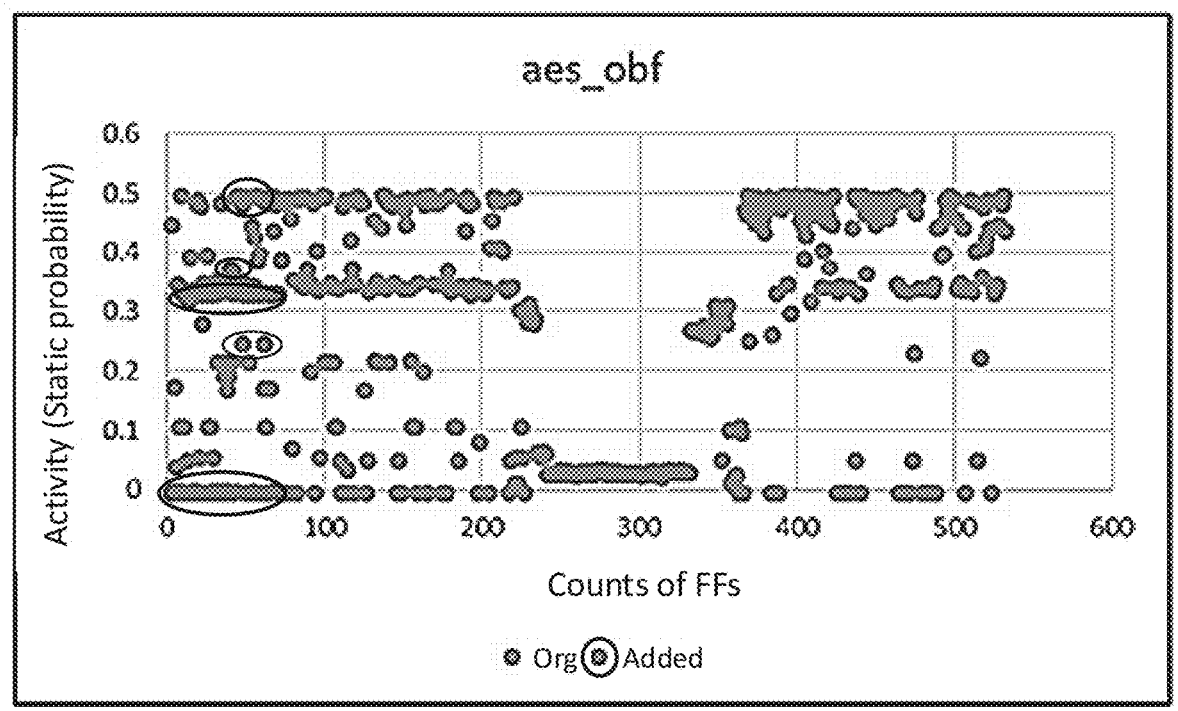
FIG. 17 provides a probabilistic analysis of flip-flop outputs as a function of random input patterns in accordance with the present disclosure.

To prevent locating the added flip-flops and eventually prevent flip-flop removal or manipulation of enable signals, in various embodiments, the switching activity and probability of each net and flip-flop are made sure to be identical for both obfuscated circuitries and original design circuitries in the locked mode of operation. FIG. 17 shows the activity analysis of AES-128 module flip-flops in the locked mode of operation for 10000 random input patterns. It is clear from the plot that the added flip-flops have identical activity value as of the original ones, and there is no outlier to reveal the identity of any flip-flop.

Figure 18:
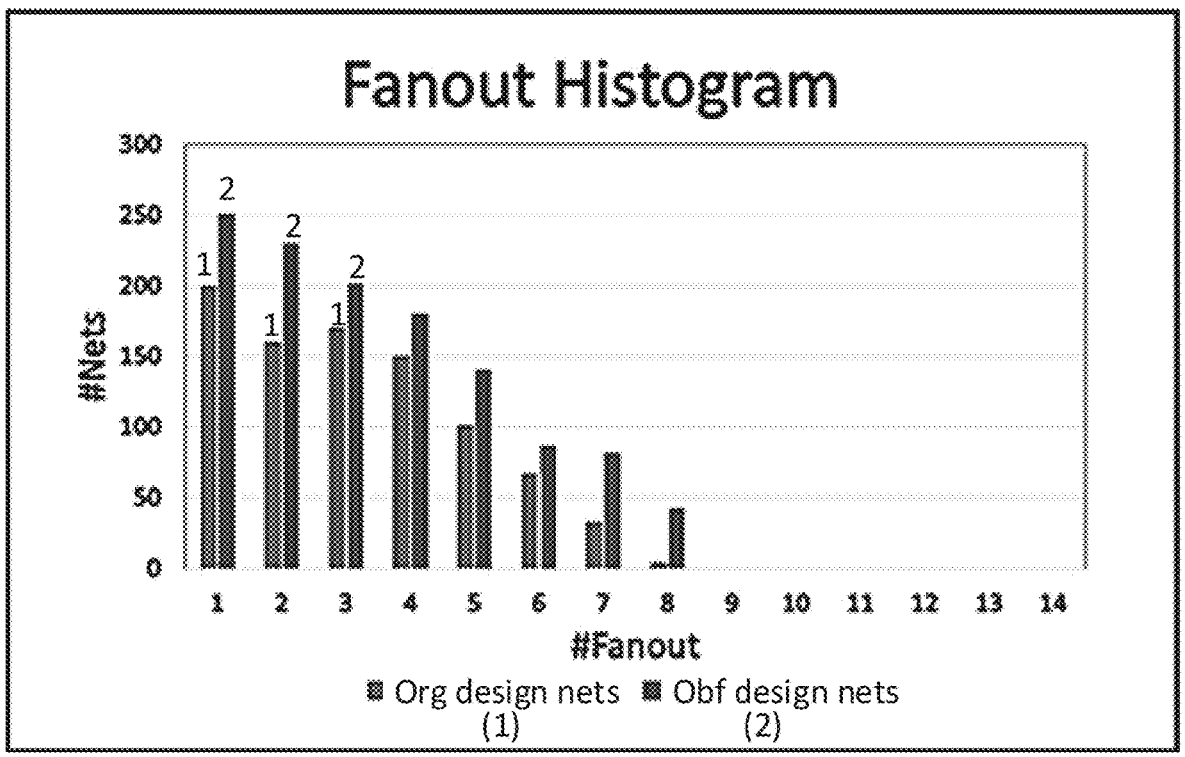
FIG. 18 illustrates a fanout histogram of each net in various obfuscated designs having identical fanout distributions in accordance with the present disclosure.

In general, the OFSMs and DFSMs are designed in an efficient way to drive as many flip-flops as they can. However, having a high fanout of enable signal also leads to a path of identifying the added flip-flops or enable signals. To make an exemplary obfuscated design resilient to this type of attack, the design is obfuscated and synthesized under a fanout constraint. Accordingly, due to the constraint design and synthesis, the fanout of each net does not exceed the constraint value, as shown in FIG. 18 which demonstrates that no net in certain exemplary obfuscated designs in accordance with the present disclosure has more than 8 nets in fanout of each particular net.

Figure 19:
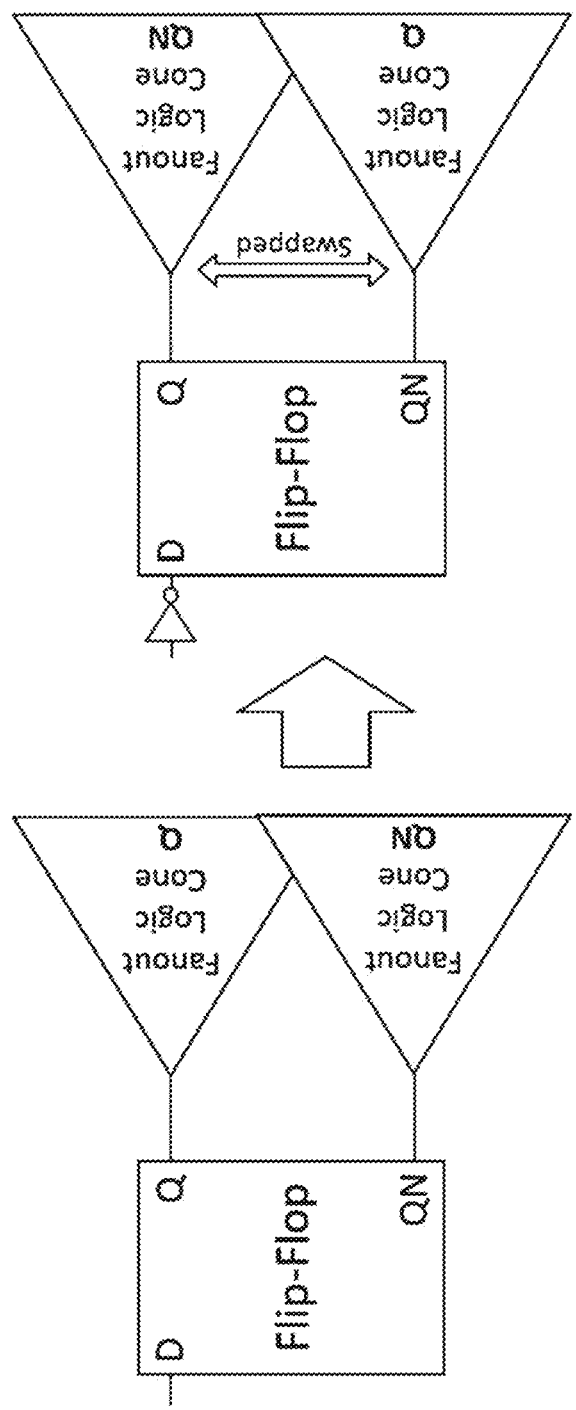
FIG. 19 illustrates a state flip-flop whose output ports are swapped after obfuscation in accordance with embodiments of the present disclosure.

As discussed, any sequential design starts from the initial state and the initial state of an FSM is clearly identifiable from the synthesized gate-level netlist of the design. Usually flip-flop types in a gate-level design are dictated by the reset or initial state of each flip-flop (variable in RTL). For example, if a variable uses asynchronous reset logic to reset a variable to 0, it is mostly going to be synthesized using an asynchronous clear flip-flop. Hence, by analyzing the netlist and looking into the types of flip-flops, it is easy for an adversary to figure out the initial state and force the flip-flops to have those values to the output of the flip-flop (e.g., this is called an initialization attack). Usually with this type of attack, state-space obfuscation logic can be bypassed to reach to the initial state. To prevent such access to the initial state, an exemplary obfuscation algorithm incorporates randomizing the initial state by making structural changes to the flip-flop without altering the functionality. As a convention, if the state of the flip-flop cannot be explicitly derived from the type of the flip-flop (say D-type flip-flop), it is assumed that it will start from 0. Swapping the output nets between two output ports and adding an inverter to the input port of random flip-flops allow to flip the initial state of those particular flip-flops. The implementation is shown in FIG. 19 which swaps the initial state of a flip-flop from 0 to 1.

The advantage of swapping the output of the flip-flop is the increased complexity to initialize a design to its initial state bypassing the obfuscation logic. The attacker will not know which random set of flip-flops have gone through swapping. Hence, the attacker will try to initialize or force the flip-flops to their corresponding initial state by looking at the type of flip-flops. However, only the obfuscation logic knows the modification and will be able to properly initialize the existing state flip-flops. If a non-obfuscated design has n number of state flip-flops, the complexity to correctly initialize or force all the flip-flops to start from its initial state will be $2^n$ due to such randomization of initial state achieved through output swapping. This is an exponential complexity for a moderate number of flip-flops.

Figure 20:
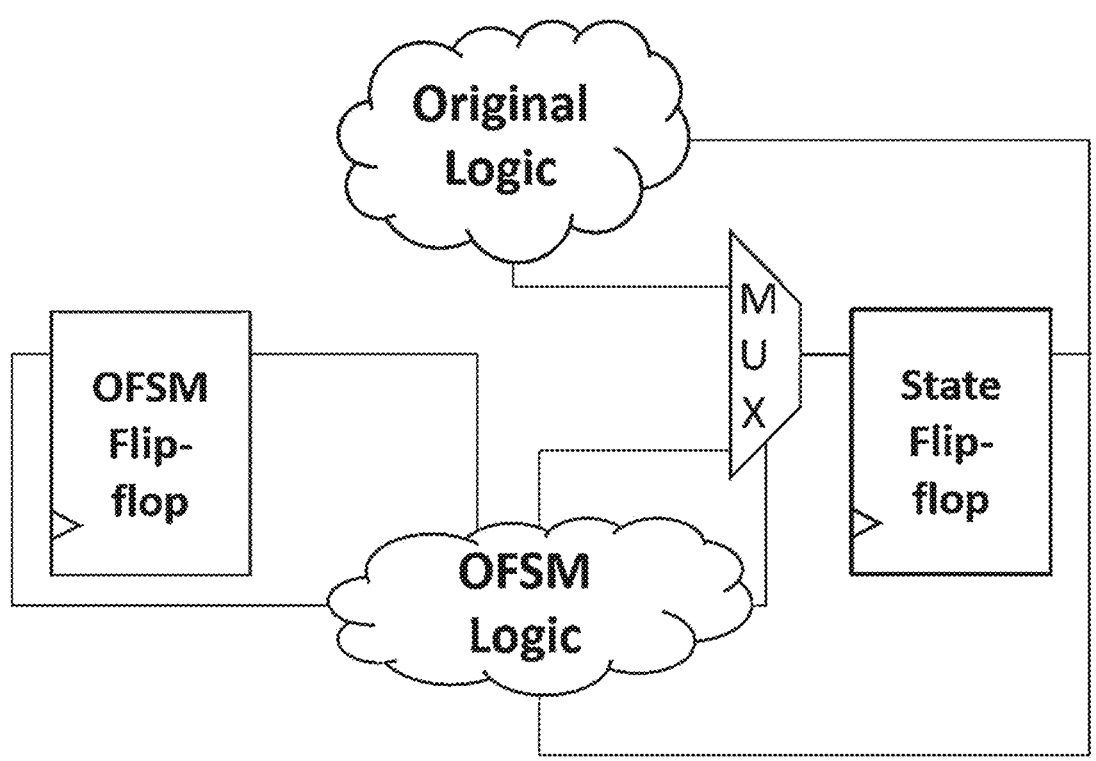
FIG. 20 demonstrates a structure of an existing state flip-flop after integration with added FSM logic in accordance with various embodiments of the present disclosure.

A white-box attack relies on identifying the added flip-flops from the pool of all flip-flops that are present in the obfuscated design. To increase the number of false positives in this case, i.e., making existing flip-flops to look structurally similar to the added FSM flip-flops, the existing flip-flops can be used to design the OFSMs/DFSMs. The flip-flops that will be part of the OFSM/DFSM will not need to be superimposed in the dummy region of operation and can hold the state values from OFSM/DFSM to make the design non-functional. FIG. 20 demonstrates the structure of the existing state flip-flop once it is integrated with the OFSM/DFSM.

As previously discussed, the number of state flip-flops present in the obfuscated design increases the attack complexity. A commercial IP will always contain a large number of data-path flip-flops in addition to the state flip-flops. In most cases, number of data-path flip-flops will be higher than the state flip-flops. For such a design, the data-path flip-flops can be disguised to act and look like a state flip-flop. Superimposition of a highly reachable FSM can be used to convert data-path flip-flops to state flip-flops by choosing data-path flip-flops as target flip-flops for superimposition instead of the state flip-flops. Such flip-flops are termed as a Highly Reachable Automata (HIRA). To achieve such a superimposition, a set of HIRA (data-path) flip-flops can be appended with the list of state flip-flops and pseudo-state flip-flops, and a combined list of target flip-flops can be made which will go through the same functional and structural obfuscation strategy. Due to this superimposition, several data-path flip-flops will look like state flip-flops, as feedback loops will be created around those flip-flops and the attacker will have to deal with a higher number of state flip-flops compared to an obfuscated design that does not have HIRA.

Figure 21:
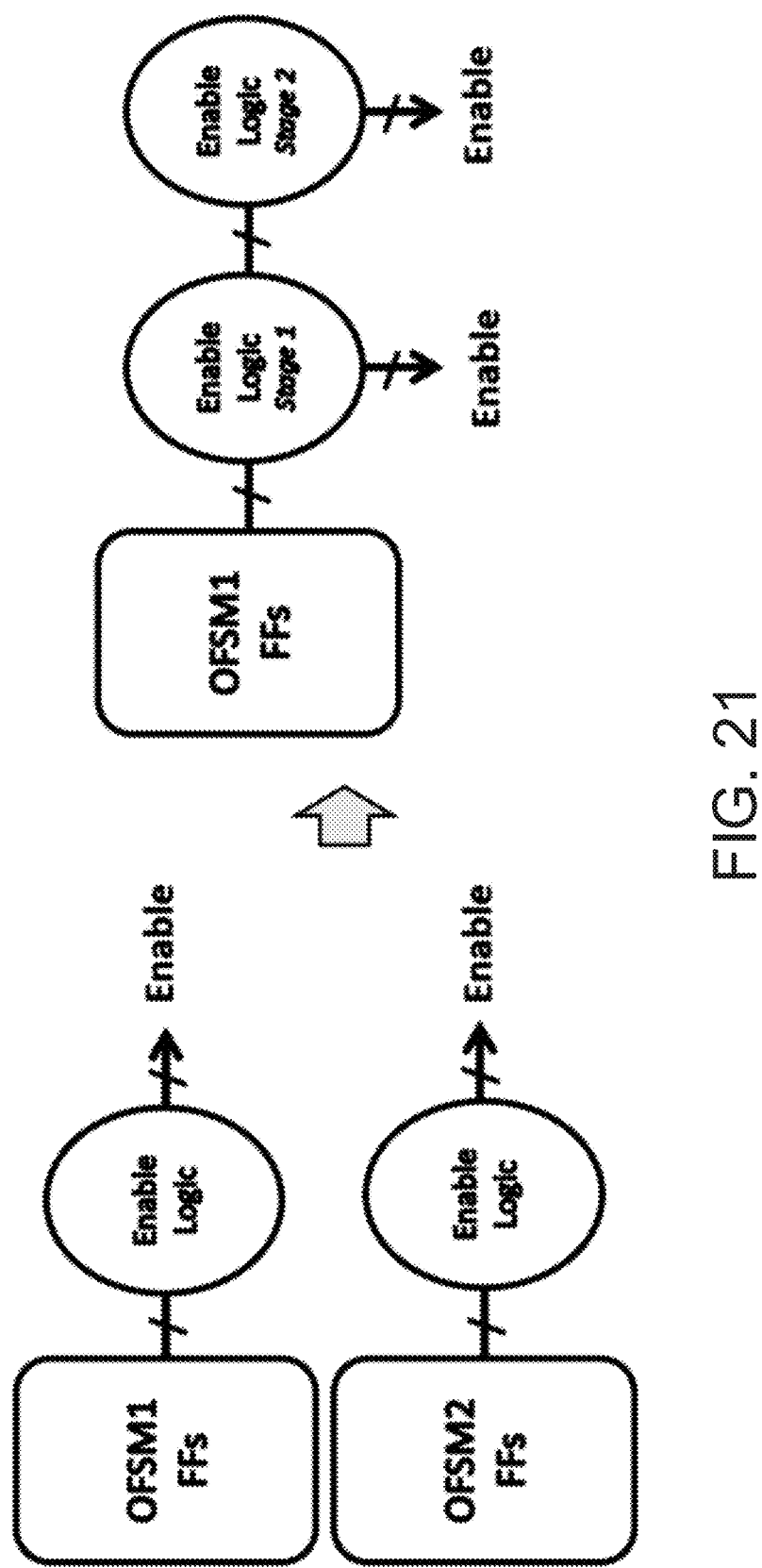
FIG. 21 illustrates an exemplary multi-stage enable generation of a single obfuscation FSM in accordance with various embodiments of the present disclosure.

While a commercial IP can have thousands of flip-flops being classified as state flip-flops, to drive those many flip-flops, a huge number of OFSMs/DFSMs may need to be added which can incur significant design overhead in aspects of area, delay, and power. In order to deal with such overhead, the driving strength of the enable signals can be increased to drive an additional number of flip-flops under maximum fanout constraints. The concept is to reuse the enable signals, being generated from one OFSM/DFSM in order to generate a new set of enable signals. A logic block can be placed at the fan-out of these enable signals to generate a second stage of enable signals and drive additional flip-flops or modification cells. FIG. 21 illustrates the multi-stage enable signal generation of a single OFSM which reduces the number of OFSMs, i.e., flip-flops, to half with a minimal increase in the size of the combinational logic. However, such an increment in combinational logic is significantly lower than adding a full OFSM. The same approach can be applied to reduce the number of DFSMs as well. By making a trade-off between the level of security and incurred overhead, a number of stages of enable signals from one FSM can be determined.

State-space obfuscation, in accordance with embodiments of the present disclosure, is a complex yet comprehensive solution in comparison to the existing other logic locking techniques. As discussed previously, it involves analysis of different design features and algorithmic modification of the behavior, which is a major effort to manually make the necessary changes. Hence, in accordance with various embodiments of the present disclosure, a fully automated computer aided design (CAD) tool (referred to as ProtectIP) is provided that can take a Verilog/VHDL design as input and generate an obfuscated design without any designer intervention being required using the exemplary flow chart shown in FIG. 22. Each step of the flow chart is briefed in the following discussion.

First (1), ProtectIP can take both RTL and gate-level abstraction of any sequential design. However, obfuscation is performed on the gate-level netlist mapped to a specific standard cell library as the front-end of the tool identifies specific set of cells. In one embodiment, LEDA 250 nm cell library is used as internal cell library to map (or re-map) the input design using a commercial synthesis tool. In various embodiments, ProtectIP can handle almost every cell library provided that the cell library files can be accessed by the tool. ProtectIP can generate a LEDA mapped Verilog netlist at the end of this step. Second (2), ProtectIP can use graph-based algorithms for internal operation such that the front-end of the tool generates the graph from the gate-level netlist mapped to LEDA using its own enriched graph data structure, in which the graph contains all the required information for feature extraction and obfuscation. Third (3), using the structure described in relation to FIGS. 2B-2C, ProtectIP identifies a set of state flip-flops present in the graph by traversing the outputs of each of the flip-flops, such that the set of state flip-flops is the primary target of obfuscation. Fourth (4), in accordance with the structure of pseudo-state flip-flop described in relation to FIGS. 3A-3E, a subset of flip-flops may also be identified as pseudo-state flip-flops at the end of this step. The set of pseudo-state flip-flops can be appended to the list of target flip-flops for obfuscation.

Fifth (5), to increase the reverse engineering attack (white-box) complexity, a set of data-path flip-flops can be converted to state flip-flops in accordance with the teachings of the present disclosure. The choice of HIRA flip-flops is not random. Instead, ProtectIP chooses HIRA flip-flops based on the level of depth of the flip-flop from the input and the output. For achieving maximum structural transformation, the flip-flops at the mid-depth level can be chosen and can be appended with the list of target flip-flops for modification. This is an optional feature that can be configured as per requirement of attack complexity. Sixth (6), once state, pseudo-state, and HIRA flip-flops have been chosen, a comprehensive list of all three types of flip-flops can be identified and generated. In case the design does not have any state flip-flops, it will render having no flip-flops identified as pseudo-state flip-flops, which means that there will be only data-path flip-flops. As a choice of HIRA flip-flops is an optional feature, ProtectIP may end up having no target flip-flops. In that case, ProtectIP will choose 10% of all the data-path flip-flops randomly as HIRA flip-flops. After a set of flip-flops have been found, the remainder of the obfuscation flow can be continued. In short, ProtectIP is able to handle designs with any combination of state, pseudo-state, and data-path flip-flops. Seventh (7), state-space obfuscation initializes all the state and pseudo state flip-flops to their initial state that is being recorded from the functional simulation in accordance with teachings of the present disclosure.

Eighth (8), the list of target flip-flops can be used to superimpose a highly reachable FSM. For example, a gate-level design of a pre-synthesized NLFSR will be converted to a graph and only the combinational logic of this graph will be superimposed through the multiplexer. NLFSR and original FSM logic can be connected to random input branches of each of these multiplexers to avoid a structural signature. Ninth (9), based on the requirement and specific features of the flip-flops, flip-flop types will be modified and corresponding changes will be incorporated. For the tenth step (10), to randomize the initial state of the existing state flip-flops, random target flip-flops will be chosen and the output nets will be swapped between the Q and QN ports available for each flip-flop. Also, an inverter will be added to the input of the flip-flop to maintain the functional equivalence for that particular flip-flop's input-output.

For the eleventh step (11), strategic nodes of the graph will be chosen based on their ranks to insert modification cells. Such nodes will be further analyzed to see if they are directly connected to the primary input, primary output, or the target flip-flop's input. If connected, those nodes will be identified as non-suitable nodes for modification cell insertion. Based on the designer configurable number of modification cells, a sub-set of suitable nodes will be chosen to insert random modification cells (AND, OR, XOR, XNOR, NAND, NOR, etc.). One input to these modification cells will be tied to the output of a suitable node whereas other input(s) will come from the DFSM enable signal.

Regarding the twelfth step (12) of the flow chart, critical assets of the obfuscated design include the added OFSMs and DFSMs. In various embodiments, ProtectIP uses a scalable algorithm to design very large FSMs with configurable size and reachability. While designing FSMs, ProtectIP considers a number of factors. For example, one factor involves the size and reachability of each FSM. Accordingly, a designer may want to design an FSM with any number of flip-flops, which is why minimum and maximum size of FSMs can be configured by the designer. Also, the designer may want to design FSMs with a really large number of flip-flops, e.g., 32 flip-flops. Obviously, using 232 states will not be cost effective and will slow down the obfuscation process also, which is why the configurable reachability of state-space can be specified as an input, so that ProtectIP encodes only a specified number of states.

Figure 23:
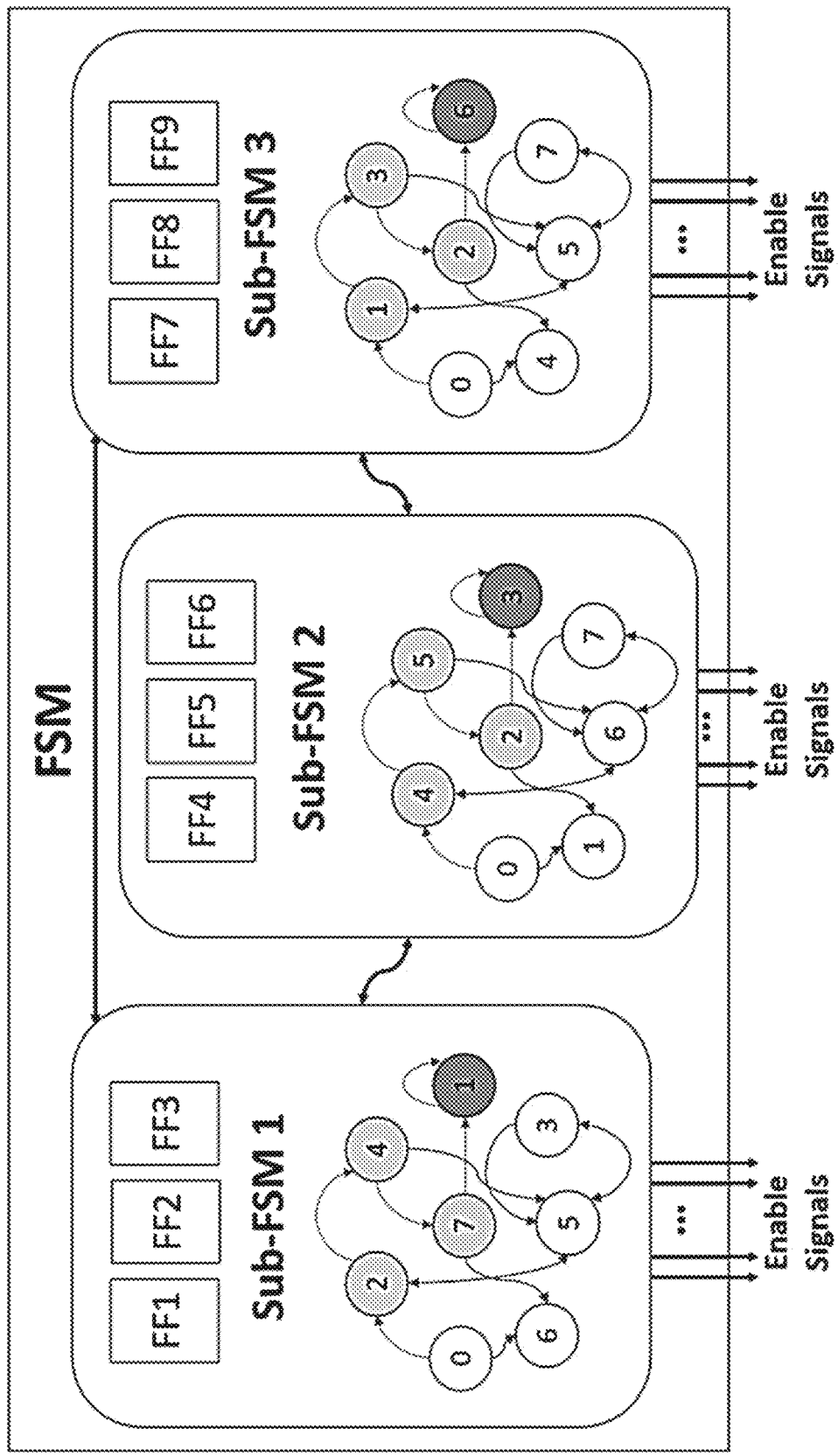
FIG. 23 illustrates enable signal generation for a FSM having multiple sub-FSM in accordance with various embodiments of the present disclosure.

A second factor involves the generation of the enable (and reset) signal for each FSM. As such, ProtectIP breaks down the specified size of each FSM to multiple sub-groups to efficiently generate the enable signals (and reset signals for OFSMs). As an example, let's assume that an FSM with 9 flip-flops is used, as shown in FIG. 23. First, a random grouping of flip-flops will be performed which will divide 9 flip-flops into sub-groups, e.g., three sub-groups of 3, 3, and 3 flip-flops, where each subgroup will be considered as a separate sub-FSM. In various embodiments, ProtectIP will internally enumerate all possible states for each of the sub-FSMs and randomize the sequence. For example, 3 flip-flop sub-FSM can render to a state-space of state values: 0, 1, 2, 3, 4, 5, 6, and 7. After randomization, the sequence will get altered and the state-space will be divided in three regions: authentication, enable, and dummy. In this way, all sub-FSMs will have their own set of authentication, enable, and dummy states, which can be used to generate enable signals as well as reset signals. For the number of signals generated from each sub-FSM, a maximum allowed fanout (designer configurable) should be considered. For example, if the maximum fanout is maxFanout, ProtectIP uses 2*maxFanout as the upper bound for the number of enable signals from each sub-FSM. Accordingly, each enable signal can be used to drive maxFanout flip-flops or modification cells. As such, an optimized number of added FSMs can be decided based on the number of state flip-flops and modification cells.

At this point, ProtectIP can generate a combined state-space for the full FSM (9 flip-flops). The reachability provided as an input will be divided in three parts to determine the number of combined states in each of the three regions. To create the authentication region of states, ProtectIP will choose one random state from the authentication regions of each sub-FSM and concatenate them to form one combined authentication state for the full FSM. This step will be repeated until number of required authentication states are formed. The number of authentication states of the full FSM will define the length of the sequence for one particular FSM. Once, the authentication region is created, the same choose-concatenate approach can be used to generate the enable and dummy regions for the full FSM. Accordingly, one full FSM will be generated which will have authentication, enable, and dummy regions of states being formed. The similar divide-enumerate-randomize-choose-concatenate flow can be repeated to generate all the required FSMs with enable (and reset) signals.

A third factor involves key inputs and sequence generation. ProtectIP is able to support the designer configurable key size. Once all the FSMs are generated, the length of the sequence will be known to ProtectIP, and ProtectIP will decide the number of average key-bits (P') from the length of the sequence (Q) and key size using the following equation:

$$(P'=\text{keysize}/Q). \quad (4)$$

For example, if a 512-bit key is being requested by the designer and the length of the sequence is 200, an average 3-bit (P') per key value is required. ProtectIP will use (P'−1) to (P'+1) randomly as the width of each key per FSM (P). Random P primary inputs will be chosen as key inputs for a FSM and a random P-bit binary number will be generated to be used as the key for each state transition in a particular FSM. In this way, a key based state traversal of FSM(s) will be generated. Since the average width of key (P') is different than the actual key width being used (P), the size of the final key may be different than the input key size. Thus, randomization is required to bring dissimilarity between the FSMs and prevent a find-one-find-all scenario.

A fourth factor involves multiple FSMs to read the key sequence. As the key values will be read by the added FSMs in sequence, some minor modifications should be supported by each O/DFSM. In the case of having multiple added FSMs, during the key application to a FSM, other FSM(s) will go to the dummy states and be brought back to its initial or reset state to ensure the key loading for each particular FSM. That is why, when the first FSM reaches the state preceding the first enable state (for DFSM) or the state preceding the pre-enable state (for OFSM), the next FSM must be brought back to its reset state as shown in FIG. 23, which can be achieved by checking the state value of one FSM in the following FSM and creating a state transition path to the reset state of the second FSM. A fifth factor involves the simultaneous state transition to the enable region. To maintain consistency of the initial state throughout all the state flip-flops, all OFSMs must stay in the initialization state for one clock cycle before entering the enable regions. DFSMs need not support this feature since they are not used for state initialization.

Figure 22:
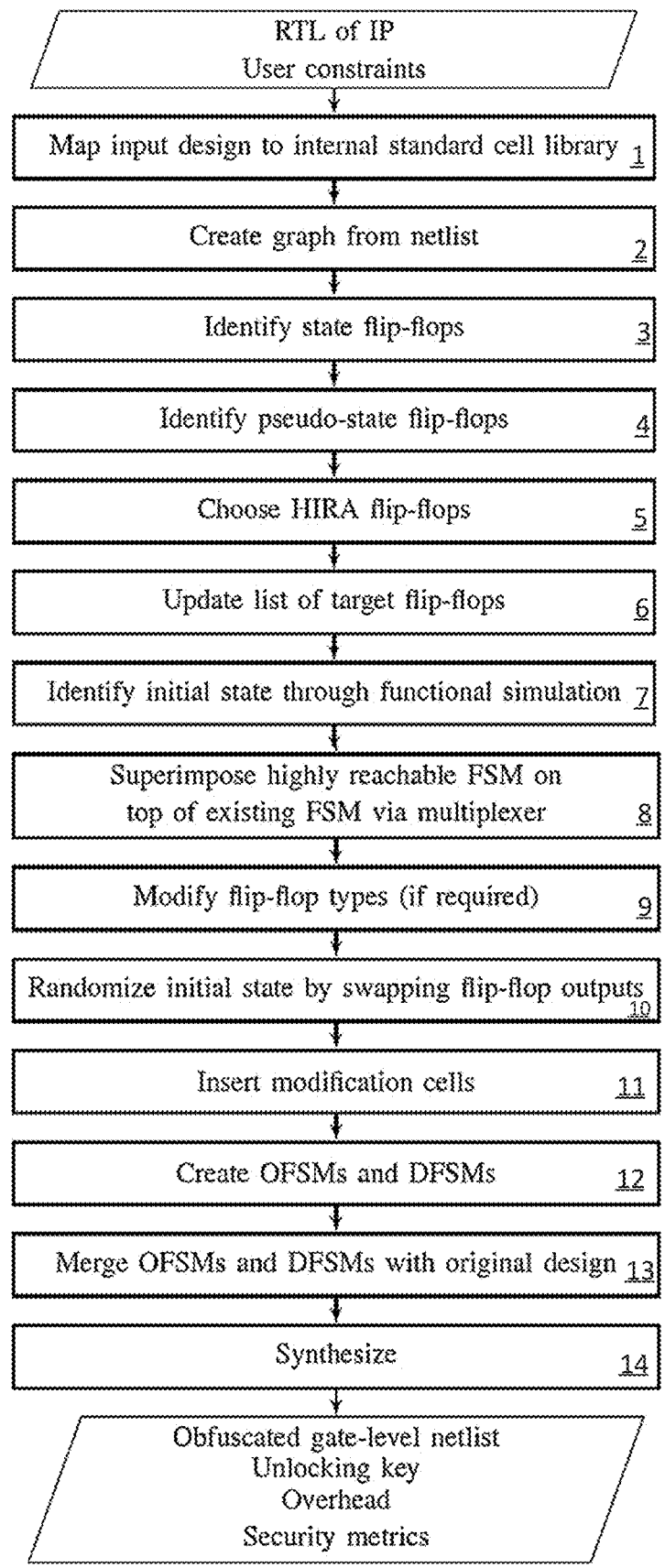
FIG. 22 illustrates an exemplary flow chart for state-space obfuscation in accordance with various embodiments of the present disclosure.

Referring back to the flow chart of FIG. 22, for the thirteenth step (13), in order to merge the OFSMs and DFSMs with the original design, enable (and reset) signals can be tied to the corresponding ports of the multiplexers or modification cells. Following the preceding protocols, all the required modifications to the existing design can be completed and final obfuscated design can be generated. All the modifications and/or additions of logic will be reflected to one big RTL file which gives the debugging capability to the designer. For the fourteen step (14), the obfuscated RTL file will be synthesized to map the design to a standard cell library using a commercial synthesis tool and obfuscated gate-level netlist will be generated. In various embodiments, ProtectIP is able to report white-box and black-box attack complexity values. Using the actual key size found earlier, black-box attack complexity can be calculated as per Eqn. 2. From the design of the OFSMs and DFSMs, the number of added flip-flops can be collected and used to determine the white-box complexity using Eqn. 3. Since the number of flip-flops can be high and may lead to a large combinatorial calculation, ProtectIP uses Kamenetsky Formula to approximate the complexity value, in various embodiments of the present disclosure.

In summary, an exemplary obfuscation approach, in accordance with embodiments of the present disclosure, addresses all known vulnerabilities inherent to existing obfuscation techniques and is resilient to a variety of attacks that apply to sequential obfuscation. A comprehensive defense mechanism, in accordance with embodiments of the present disclosure, shrinks the possibilities of breaking the defense, except for a brute force mechanism, which also will take an infeasible amount of time in state-space obfuscation. To further improve the security of the state-space obfuscation, various embodiments of the present disclosure also incorporate an exemplary FSM Steganography method.

In such an FSM Steganography approach, two FSMs are merged into one, with their combinational part. Here, an original circuit (CircuitA) is buried into a dummy circuit (CircuitB). The original FSM is referred to as FSMA, and the dummy FSM is referred to as FSMB. The combinational part of each FSM is merged, while the primary inputs and outputs for both circuits are shared. The merging process integrates a key-controlled locking mechanism that allows either CircuitA or CircuitB to be active. Hence, both circuits can be time-multiplexed and used for various applications, while keeping the overall system functionally and structurally secured. FIG. 24 shows an example of merged FSMs, where an original FSM and a dummy FSM are merged and locked using a key-controlled locking mechanism, in accordance with various embodiments of the present disclosure In various embodiments, each key bit is assigned to a state, where the applied value dictates whether the state transition should follow FSMA or FSMB. Applying an incorrect key corrupts the state transition, which in turn locks the circuit and causes invalid outputs. The key value that enables FSMA is the compliment of the key that enables FSMB. Moreover, the enable signal used for the state-space obfuscation process, which does not require dedicated primary input ports to use for key application. In various embodiments, the switching between FSMs in the merged circuit will have the following 3 modes:
(1) CircuitA enabled: When applying Key A.
(2) CircuitB enabled: When applying Key B.
(3) Circuit is disabled: When applying incorrect key values.

A goal of the merging process is to map each state in FSMA to a unique state in FSMB. To perform the mapping, each FSM is broken down into a set of non-touching paths. The extracted paths are then sorted by length for each FSM. The merging process merges a path from FSMA that shares the same length with a path from FSMB. The merging process is demonstrated in Algorithm 2 of FIG. 25.

The merging process in Algorithm 2 (FIG. 25) incorporates the state transition graphs GraphA and GraphB for circuits CircuitA and CircuitB. Each graph is broken into non-branching paths, with the condition of vertices being used only once. The resultant paths are sorted by lengths, and each corresponding path is merged. The state merging process places the instructions of both states into the new merged FSM, with state-transitions controlled by a key value. If the number or the lengths of paths do not match, additional states for those non-mapped paths will be created and added to the merged FSM graph GraphM. The output of this process is the merged FSM graph GraphM, which includes the combinational functionality of both circuits. Other outputs of the algorithm include KeyA and KeyB, which are used to enable the functionality of CircuitA and CircuitB respectively.

It is noted that evaluation of any obfuscation technique relies on specific metric value(s). Each of the obfuscation methods is tied to specific metrics. However, existing metrics are not well defined and are not able to quantify the strength of obfuscation or the goal of obfuscation. Therefore, a set of metrics is developed that can be used for quantifying the level and effectiveness of state-space obfuscation and is discussed in the following pages.

In information theory, entropy is a concept of predictability of information at the output of a system. According to the Shannon entropy formula, the randomness or unpredictability of information content, i.e., entropy, is the mean value of the information contained in a message. If $p_i$ is the probability of the $i^{th}$ character being present in the message and n is the number of characters in the message, H represents the entropy or the amount of randomness in the message. Therefore, $$H = \sum_{i=1}^{n} p_i \log_b \frac{1}{p_i}.$$

The same concept can be applied to the FSM obfuscation to represent the entropy of an FSM. Therefore, $$H_{FSM} = \sum_{i=1}^{n} H_{state_i}$$

$$H_{state_i} = \sum_{i=1}^{k} p_{next-state_i} \log_2 \frac{1}{p_{next-state_i}}$$

where, $H_{FSM}$=Entropy of the FSM, $H_{state_i}$=Entropy of the $i^{th}$ state, n=Total number of states present in the FSM, k=Total number of states possible from the $i^{th}$ state, $p_{next-state_i}$=Probability of transitioning to a next state from $i^{th}$ state For a complex or highly reachable FSM, the entropy increases significantly, which directly quantifies the difficulty of reverse engineering. Higher entropy means that a large number of possible states and state transitions is present in the FSM. Hence, the attacker will now have to deal with a massive complexity. State-space obfuscation increases the state reachability and the entropy of the FSM. In this way, reverse engineering of the FSM is proven to be harder.

The exemplary obfuscation approach of the present disclosure transforms the design in a way that the whole structure of the design is modified and different from the original design to a greater extent. To quantify the design structure transformation, formal tools are used to generate a metric called percentage of node failure. Due to the modification of fan-in and fanout cones of flip-flops in the design, a maximum number of node failures is achieved while trying to match the structure of two instances of the design—before obfuscation and after obfuscation. The percentage of node failure can be represented as, $$P_{failure} = \frac{\text{number of node failures}}{\text{total number of nodes}}.$$

As discussed previously, to automate the process of obfuscation and security analysis, a tool called Protect/P is provided in various embodiments. In one embodiment, the tool follows the algorithm listed in Algorithm 1 (FIGS. 1B-1C), which implements the state-space obfuscation methodology, in various embodiments. The tool runs on sequential designs to identify the state flip-flops & modify the state transition space as well as the combinational logic of the original design and obfuscate the design's functional behavior as well as structure.

The present disclosure presents a distinct netlist-level obfuscation of hardware IP that addresses the major vulnerabilities related to the current SoC supply and manufacturing process. An exemplary obfuscation algorithm is proven to be resilient to all known and a set of new attacks and can keep the manufacturing process of SoC transparent by ensuring active participation of all parties involved in the process. State-space obfuscation also ensures that the IP rights are being protected at all stages of IP supply chain. The scheme is capable of being integrated to the industrial flow using an exemplary automation tool and provide end to end security to the hardware IP.

Various innovations are described in the present disclosure, such as, but not limited to, the following items: (1) A novel, secure, and scalable sequential obfuscation technique to be incorporated in the current semiconductor industry; (2) A set of new attacks applicable to sequential obfuscation; (3) The attack complexity of an exemplary obfuscation technique is justified to claim that the obfuscation methodology is provably secure against attacks; (4) A novel combination of both combinational locking and sequential locking of hardware IP; (5) Artificially increasing the reachability of any sequential design to the maximum; (6) Making combinational locking dependent on sequential state transitions of dummy FSMs (unlike logic locking). Here, dummy FSMs generate the key values to drive the inserted key gates rather than visible key inputs; (7) Creation of novel obfuscation circuitries using register-transfer level abstraction and merging them with the gate-level design, which is a unique approach to nullify the possibility of any structural signatures; (8) Convert data-path heavy designs into control-path heavy designs by superimposing FSM logic onto the design. Here, superimposition is performed on both data-path and control-path flip-flops to avoid structural signatures; (9) A new concept of pseudo-state flip-flops, which have been categorized as data path flip-flops in the existing literature; (10) An FSM steganography method that merges two FSMs into a mixed one, and adds a key-controlled locking mechanism that can control which of the original circuits is enabled; (11) A tool for automated obfuscation and security analysis of firm IP; (12) Obfuscation metrics that quantify the strength of obfuscation. Where existing research does not contain quality metrics of obfuscation, an entropy-based metric is developed to quantify the strength of state-space obfuscation and another on the structural property of the obfuscated design to quantify the amount of design transformation.

In spite of emergence in hardware obfuscation to address IP security vulnerabilities, most of the techniques lack in addressing design flaws such as the less reachable FSM, obvious structure of netlist, less reverse engineering complexity, etc. Such design inherent flaws, being undetected and unaddressed, give advantages to the adversaries to perform a number of structural and functional attacks and get pirated copies of the valuable hardware IPs. The present disclosure offers a mathematically robust and secure obfuscation methodology that can address design inherent flaws and can add exponential levels of difficulty to perform reverse engineering attack to clone or maliciously modify the IP. The present disclosure provides functional and structural transformation aspects of the obfuscation that need to be incorporated while protecting an IP using logic obfuscation. Through mathematical analysis, an overview of the attack complexity has been introduced through multi-level implementations. In various embodiments, unreachable states under a normal mode of operation of the IP can be determined in a scalable way and used to enrich the obfuscated mode of operation along with an exemplary enhancement methodology, in accordance with embodiments of the present disclosure.

Figure 26:
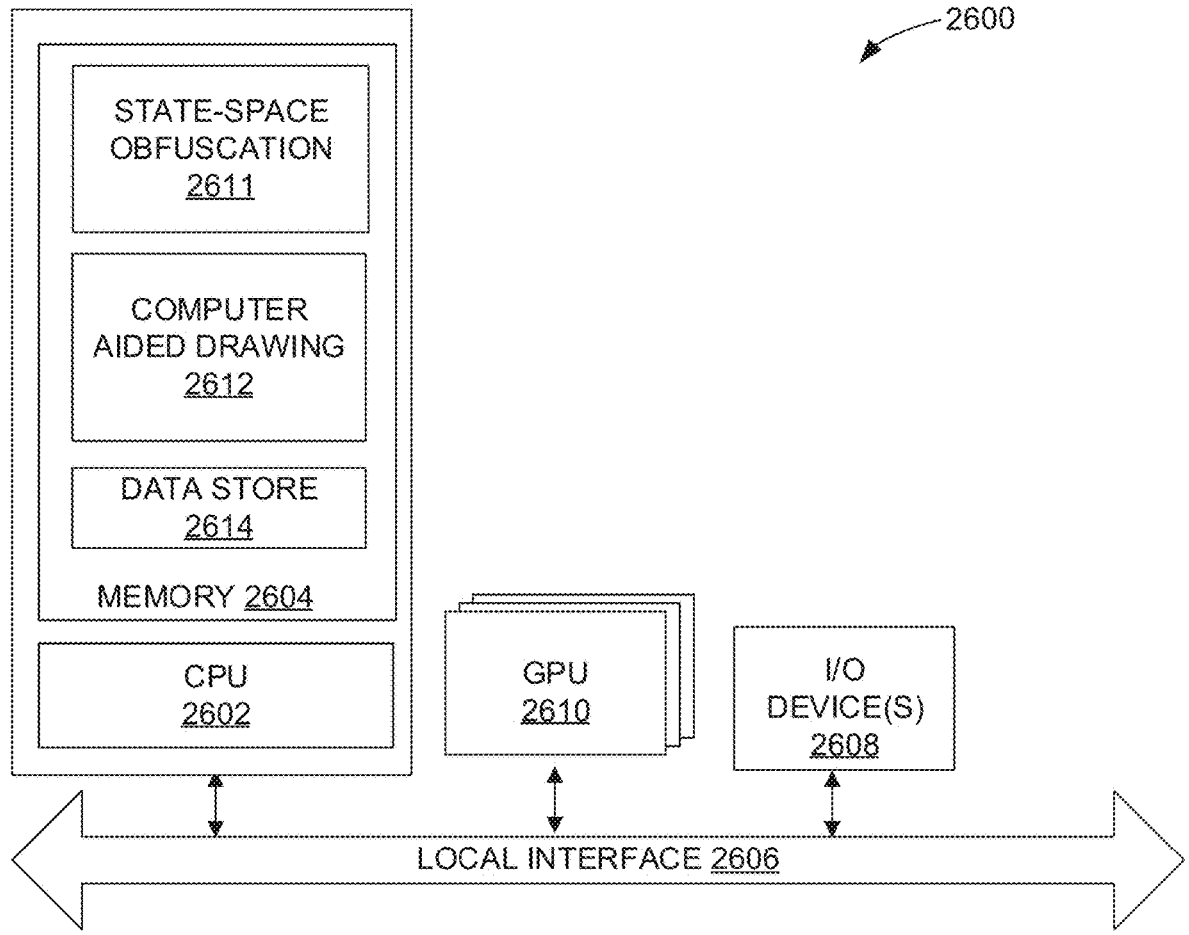
FIG. 26 depicts a schematic block diagram of a computing device that can be used to implement various embodiments of the present disclosure

FIG. 26 depicts a schematic block diagram of a computing device 2600 that can be used to implement various embodiments of the present disclosure. An exemplary computing device 2600 includes at least one processor circuit, for example, having a processor 2602 and a memory 2604, both of which are coupled to a local interface 2606, and one or more input and output (I/O) devices 2608. The local interface 2606 may comprise, for example, a data bus with an accompanying address/control bus or other bus structure as can be appreciated. The computing device 2600 may further include Graphical Processing Unit(s) (GPU) 2610 that are coupled to the local interface 2606 and may utilize memory 2604 and/or may have its own dedicated memory. The CPU and/or GPU(s) can perform any of the various operations described herein.

Stored in the memory 2604 are both data and several components that are executable by the processor 2602. In particular, stored in the memory 2604 and executable by the processor 2602 are state-space obfuscation code 2611 (e.g., ProtectIP program) and a computer aided design (CAD) code 2612. Also stored in the memory 2604 may be a data store 2614 and other data. The data store 2614 may store data related to the computations performed by the state-space obfuscation code 2611 and/or the CAD code 2612. In addition, an operating system may be stored in the memory 2604 and executable by the processor 2602. The I/O devices 2608 may include input devices, for example but not limited to, a keyboard, mouse, etc. Furthermore, the I/O devices 2608 may also include output devices, for example but not limited to, a printer, display, etc.

Embodiments of the present disclosure can be implemented in hardware, software, firmware, or a combination thereof. In an exemplary embodiment, state-space obfuscation logic or functionality is software or firmware, the contents of which can be stored in computer readable media, such as memory, and that is executed by a suitable instruction execution system. If implemented in hardware, as in an alternative embodiment, state-space obfuscation logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method of protecting an integrated circuit design by locking sequential and combinational logic of the integrated circuit design, the method comprising:
    obtaining, by a computing device, a gate-level netlist for the integrated circuit design, wherein functionality of the integrated circuit design is enabled by input of key inputs;
    identifying, by the computing device, control path state elements that constitute a finite state machine (FSM) within the integrated circuit design and any pseudo-state elements within the gate-level netlist for the integrated circuit design, wherein the pseudo-state elements constitute data path flip-flop circuit elements that impact a state transition of the FSM, wherein the control path state elements comprise flip-flop circuit elements having a feedback path;
    adding, by the computing device, one or more extra FSM elements using a multiplexer to an input of individual ones of a plurality of target elements of the integrated circuit design in parallel with original design logic at the input of the target element, wherein the plurality of target elements constitute the identified control path state elements and pseudo-state elements, wherein the one or more extra FSM elements are driven by an output of an obfuscation finite state machine that accepts a subset of the key inputs to facilitate a normal mode of operation for the integrated circuit design, wherein an input of incorrect keys that do not correspond to the subset of the key inputs cause a corruption of functionality of the integrated circuit design;
    adding, by the computing device, a dummy finite state machine to implement the corruption of the functionality of the integrated circuit design, wherein input values to the dummy finite state machine correspond to a subset of the key inputs;
    adding, by the computing device, modification cells to combinational logic of the integrated circuit design that are driven by an output of the dummy finite state machine and are configured to act as buffers when correct key inputs are applied to the dummy finite state machine and to corrupt the functionality of the integrated circuit design when incorrect key inputs are applied to the dummy finite state machine; and
    generating, by the computing device, an obfuscated gate-level netlist of the integrated circuit design after completion of the adding operations.

2. The method of claim 1, wherein the modification cells comprise XOR or XNOR logic gates.

3. The method of claim 1, further comprising selecting, by the computing device, a flip-flop circuit element in the integrated circuit design and swapping outputs of the flip-flop circuit element and reversing an initial state value of the flip-flop circuit element without altering a type of the flip-flop circuit element.

4. The method of claim 1, further comprising merging, by the computing device, an original circuit from the integrated circuit design with a dummy circuit, wherein inputs and outputs for both circuits are shared, wherein application of an incorrect key to the merged circuit corrupts a state transition and locks operation of the merged circuit.

5. The method of claim 4, further comprising initializing, by the computing device, the plurality of target elements into their power-up states upon application of a correct key to the merged circuit.

6. The method of claim 4, wherein a structure of an obfuscated circuit of the integrated circuit design after completion of the adding operations is modified to be different from a corresponding original circuit from the integrated circuit design.

7. The method of claim 4, further comprising outputting, by the computing device, a white-box attack complexity value and a black-box attack complexity for the generated obfuscated gate-level netlist of the integrated circuit design.

8. The method of claim 1, wherein the obfuscated gate-level netlist is designed to operate by:
    receiving a plurality of key inputs for enabling operation of an integrated circuit;
    determining whether the received key inputs are correct key inputs for enabling operation of the integrated circuit; and
    if the received key inputs are determined to be incorrect key inputs, locking sequential logic and combinational logic of the integrated circuit until correct key inputs are received.

9. The method of claim 1, wherein at least 3 extra FSM elements are added to the input of the plurality of target elements.

10. A system of protecting an integrated circuit design by locking sequential and combinational logic of the integrated circuit design, the system comprising:
    a processor; and
    a tangible, non-transitory memory configured to communicate with the processor, the tangible, non-transitory memory having instructions stored thereon that, in response to execution by the processor, cause the processor to be capable of performing operations comprising:
        obtaining a gate-level netlist for the integrated circuit design, wherein functionality of the integrated circuit design is enabled by input of key inputs;
        identifying control path state elements that constitute a finite state machine (FSM) within the integrated circuit design and any pseudo-state elements within the gate-level netlist for the integrated circuit design, wherein the pseudo-state elements constitute data path flip-flop circuit elements that impact a state transition of the FSM, wherein the control path state elements comprise flip-flop circuit elements having a feedback path;
        adding one or more extra FSM elements using a multiplexer to an input of individual ones of a plurality of target elements of the integrated circuit design in parallel with original design logic at the input of the target element, wherein the plurality of target elements constitute the identified control path state elements and pseudo-state elements, wherein the one or more extra FSM elements are driven by an output of an obfuscation finite state machine that accepts a subset of the key inputs to facilitate a normal mode of operation for the integrated circuit design, wherein an input of incorrect keys that do not correspond to the subset of the key inputs cause a corruption of functionality of the integrated circuit design;

adding a dummy finite state machine to implement the corruption of the functionality of the integrated circuit design, wherein input values to the dummy finite state machine correspond to a subset of the key inputs;

adding modification cells to combinational logic of the integrated circuit design that are driven by an output of the dummy finite state machine and are configured to act as buffers when correct key inputs are applied to the dummy finite state machine and to corrupt the functionality of the integrated circuit design when incorrect key inputs are applied to the dummy finite state machine; and generating an obfuscated gate-level netlist of the integrated circuit design after completion of the adding operations.

11. The system of claim 10, wherein the modification cells comprise XOR or XNOR logic gates.

12. The system of claim 10, wherein the operations further comprise selecting a flip-flop circuit element in the integrated circuit design and swapping outputs of the flip-flop circuit element and reversing an initial state value of the flip-flop circuit element without altering a type of the flip-flop circuit element.

13. The system of claim 10, wherein the operations further comprise merging an original circuit from the integrated circuit design with a dummy circuit, wherein inputs and outputs for both circuits are shared, wherein application of an incorrect key to the merged circuit corrupts a state transition and locks operation of the merged circuit, wherein a structure of an obfuscated circuit of the integrated circuit design after completion of the adding operations is modified to be different from a corresponding original circuit from the integrated circuit design.

14. The system of claim 13, wherein the operations further comprise outputting a white-box attack complexity value and a black-box attack complexity value for the generated obfuscated gate-level netlist of the integrated circuit design.

15. The system of claim 10, wherein the one or more extra FSM elements comprise non-linear feedback shift registers.

16. The system of claim 10, wherein the obfuscated gate-level netlist is designed to operate by:
receiving a plurality of key inputs for enabling operation of an integrated circuit;
determining whether the received key inputs are correct key inputs for enabling operation of the integrated circuit; and
if the received key inputs are determined to be incorrect key inputs, locking sequential logic and combinational logic of the integrated circuit until correct key inputs are received.

17. The system of claim 10, wherein the operations further comprise initializing the plurality of target elements into their power-up states upon application of a correct key to the merged circuit.

18. A non-transitory computer readable storage medium having instructions stored thereon that, in response to execution by a computer-based system, cause the computer-based system to perform operations comprising:
obtaining a gate-level netlist for an integrated circuit design, wherein functionality of the integrated circuit design is enabled by input of key inputs;
identifying control path state elements that constitute a finite state machine (FSM) within the integrated circuit design and any pseudo-state elements within the gate-level netlist for the integrated circuit design, wherein the pseudo-state elements constitute data path flip-flop circuit elements that impact a state transition of the FSM, wherein the control path state elements comprise flip-flop circuit elements having a feedback path;
adding one or more extra FSM elements using a multiplexer to an input of individual ones of a plurality of target elements of the integrated circuit design in parallel with original design logic at the input of the target element, wherein the plurality of target elements constitute the identified control path state elements and pseudo-state elements, wherein the one or more extra FSM elements are driven by an output of an obfuscation finite state machine that accepts a subset of the key inputs to facilitate a normal mode of operation for the integrated circuit design, wherein an input of incorrect keys that do not correspond to the subset of the key inputs cause a corruption of functionality of the integrated circuit design;
adding a dummy finite state machine to implement the corruption of the functionality of the integrated circuit design, wherein input values to the dummy finite state machine correspond to a subset of the key inputs;
adding modification cells to combinational logic of the integrated circuit design that are driven by an output of the dummy finite state machine and are configured to act as buffers when correct key inputs are applied to the dummy finite state machine and to corrupt the functionality of the integrated circuit design when incorrect key inputs are applied to the dummy finite state machine; and
generating an obfuscated gate-level netlist of the integrated circuit design after completion of the adding operations.

* * * * *